United States Patent [19]
Yamazaki et al.

[11] Patent Number: 5,124,839
[45] Date of Patent: Jun. 23, 1992

[54] PHASE-TYPE FOCUSING SCREEN

[75] Inventors: Shoichi Yamazaki; Hiroshi Matsui, both of Kanagawa; Nozomu Kitagishi, Tokyo, all of Japan

[73] Assignee: Canon Kabushiki Kaisha, Tokyo, Japan

[21] Appl. No.: 609,726

[22] Filed: Nov. 6, 1990

[30] Foreign Application Priority Data

Nov. 8, 1989 [JP] Japan .................. 1-290465
Oct. 23, 1990 [JP] Japan .................. 2-286392

[51] Int. Cl.⁵ .............................................. G03B 3/00
[52] U.S. Cl. ..................................... 359/454; 354/200; 359/599
[58] Field of Search ............... 350/167, 431; 354/200; 359/454, 455, 625, 626, 599

[56] References Cited

U.S. PATENT DOCUMENTS

| | | | |
|---|---|---|---|
| 3,794,829 | 2/1974 | Taljavull | 350/167 |
| 4,421,398 | 12/1983 | Suzuki et al. | 354/200 |
| 4,427,265 | 1/1984 | Suzuki et al. | 350/167 |
| 4,519,686 | 5/1985 | Seki et al. | 354/200 |
| 4,586,786 | 5/1986 | Suzuki et al. | |
| 4,697,878 | 10/1987 | Kimura et al. | 354/200 |
| 4,703,405 | 10/1987 | Lewin | 350/167 |
| 4,946,252 | 8/1990 | Sugawara | 350/431 |
| 4,982,214 | 1/1991 | Matsui | 354/200 |

FOREIGN PATENT DOCUMENTS 55-70827 5/1980 Japan .
62-269157 11/1987 Japan .

*Primary Examiner*—Bruce Y. Arnold
*Assistant Examiner*—Martin Lerner
*Attorney, Agent, or Firm*—Fitzpatrick, Cella, Harper and Scinto

[57] ABSTRACT

A focusing screen has a base plate with a planar surface. A plurality of unit regions are arrayed with a periodicity on the base plate planar surface. Each of the unit regions comprises (1) a first plurality of convex portions or concave portions having planar surfaces substantially parallel to the base plate planar surface and having a first height different from the base plate planar surface and having at least two different diameters, and (2) a second plurality of convex portions or concave portions having planar surfaces substantially parallel to the base plate planar surface and having a second height different from the base plate planar surface and having at least two different diameters.

16 Claims, 17 Drawing Sheets

PHASE-TYPE FOCUSING SCREEN

BACKGROUND OF THE INVENTION

1. Field of the Invention

This invention relates to phase-type diffusing plates. In application to, for example, the finder of the photographic camera, it relates to phase-type focusing screens having prescribed diffusion characteristics so that a good finder image can be observed.

2. Description of the Related Art

The phase-type diffusing plate has a plurality of minute patterns formed in a surface of an optically transparent base plate to a certain height so that the ones of the light rays passing through the diffusing plate which emerge from the minute patterns differ in phase from the others. Thus, the diffusing plate supplies predetermined diffusion characteristics. A wide variety of forms of the phase-type diffusing plate have been proposed.

Of these, a bi-level form of the phase-type diffusing plate whose minute patterns give the entering light bundle a phase difference of zero and another phase difference which has a predetermined value $\theta$, totaling two phase differences, is proposed in, for example, Japanese Laid-Open Patent Applications Nos. Sho 55-70827 and Sho 62-269157.

Another form which gives the entering light bundle the phase difference of zero and phase differences of $\theta_1$ and $\theta_2$, totaling three phase differences, is proposed in U.S. patent application Ser. No. 482,812 filed on Feb. 21, 1990 where the phase-type diffusing plate is made up with three plane portions A, B and C of different levels, two of which each have patterns of round or oval shape. In the above-cited U.S. Patent Application, labeling these plane portions A, B and C in the order from the thinnest thickness beneath the pattern, the plane portion A corresponds to the base plate (reference surface), while the other plane portions B and C have different heights from each other. The plane portions A, B and C then impart into the traveling light rays traveling thereacross respective different phase differences. Thus, a phase-type diffusing plate having 3 levels of different phase differences is made up.

The bi-level form of the phase-type diffusing plate has a problem that, when used as the focusing screen in the photographic system, the finder image suffers coloring and failure of uniform brightness, being difficult to observe comfortably.

Another problem is that, when the telephoto lens, close-up lens, or like lens which is largely different in the position of the pupil from the standard lens is used in combination with a stop at a small aperture, a spot having the same color as that of the 0th order diffracted light arises at the center of the field of view.

Unlike this, in the 3-level phase-type diffusing plate proposed in the above-cited U.S. Patent Application, these problems have been solved, so a finder image of no color unevenness and, moreover, rich corner brightness at the full open aperture of the stop can be observed.

SUMMARY OF THE INVENTION

An object of the invention is to further improve the previously proposed 3-level phase-type diffusing plate, that is, well correct the color unevenness at the full open aperture of the stop and sufficiently increase the brightness in the corners of the field of view by properly setting the arrangement of a plurality of minute plane portions (patterns) of predetermined shape to be formed on a surface of the base plate to three different levels as a whole.

Another object is to provide a phase-type diffusing plate of so good diffusion characteristics that when applied to the finder system, the finder image can be observed comfortably.

DETAILED DESCRIPTION OF THE PREFERRED EMBODIMENTS

Figure 1:
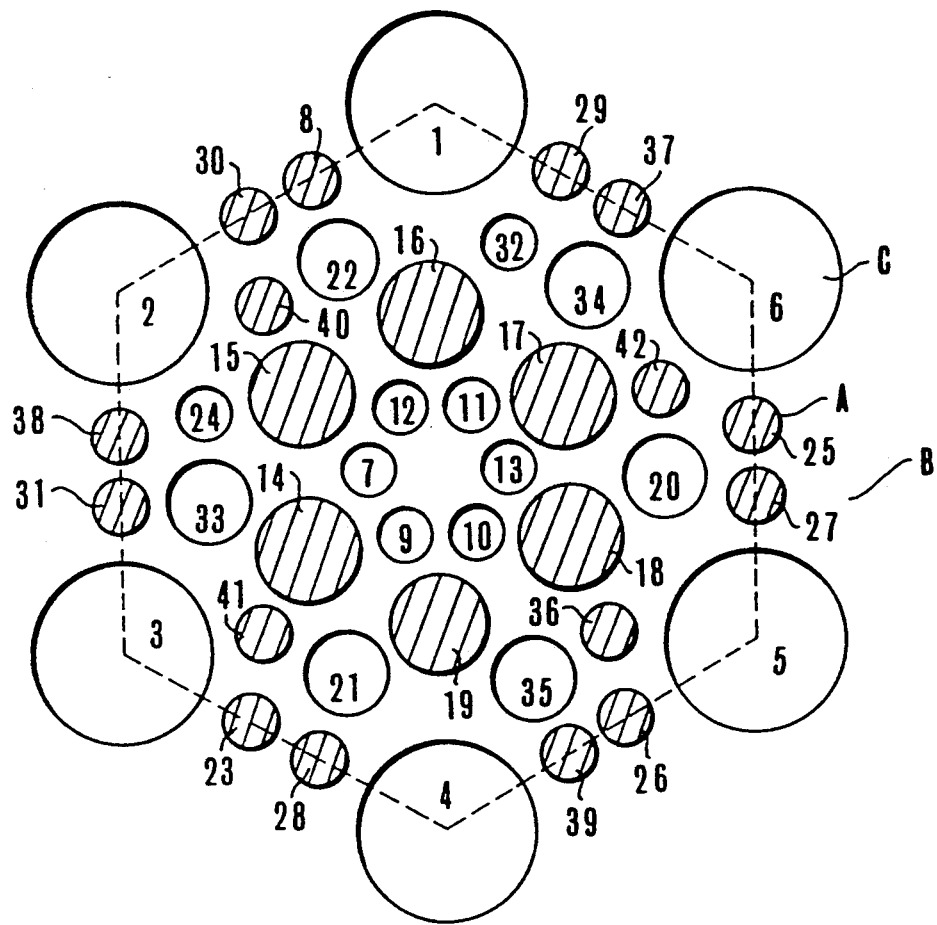
FIG. 1 through FIG. 8 are schematic plan views of embodiments 1 to 8' of the invention with the convex portions and concave portions in each unit region illustrated.
Figure 2:
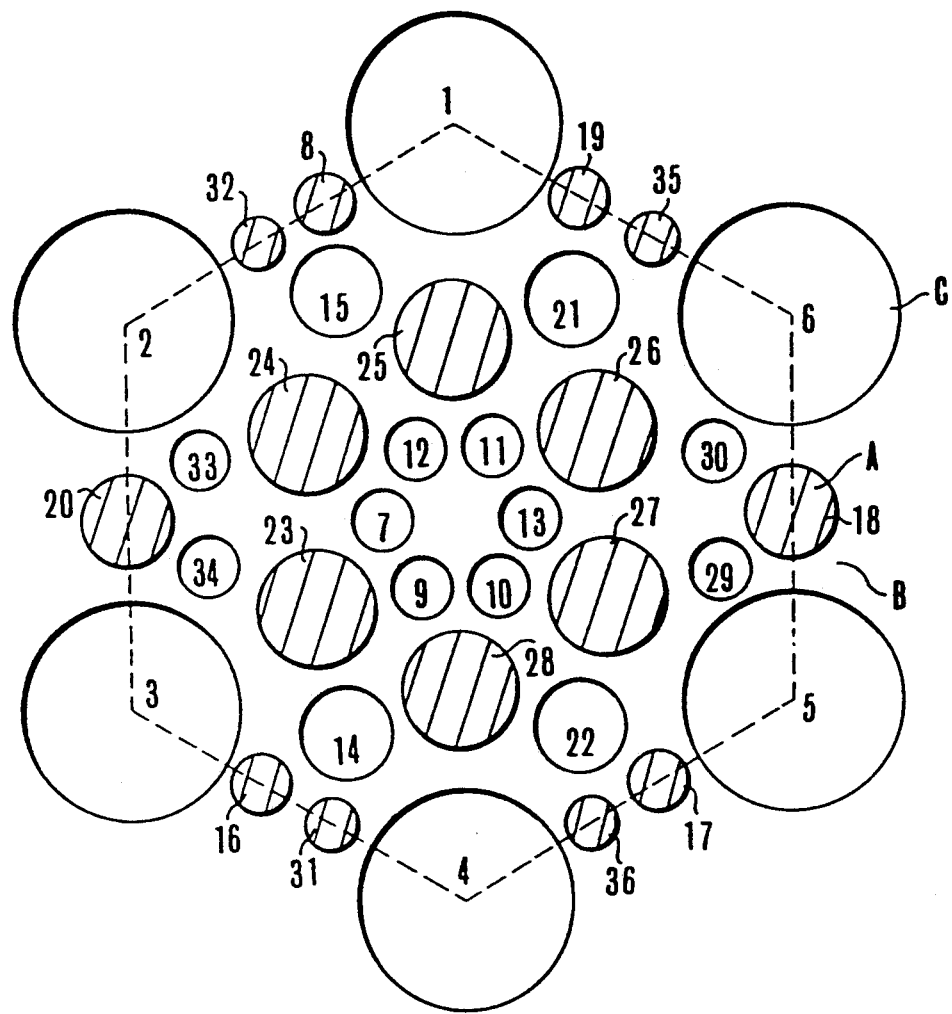
Figure 3:
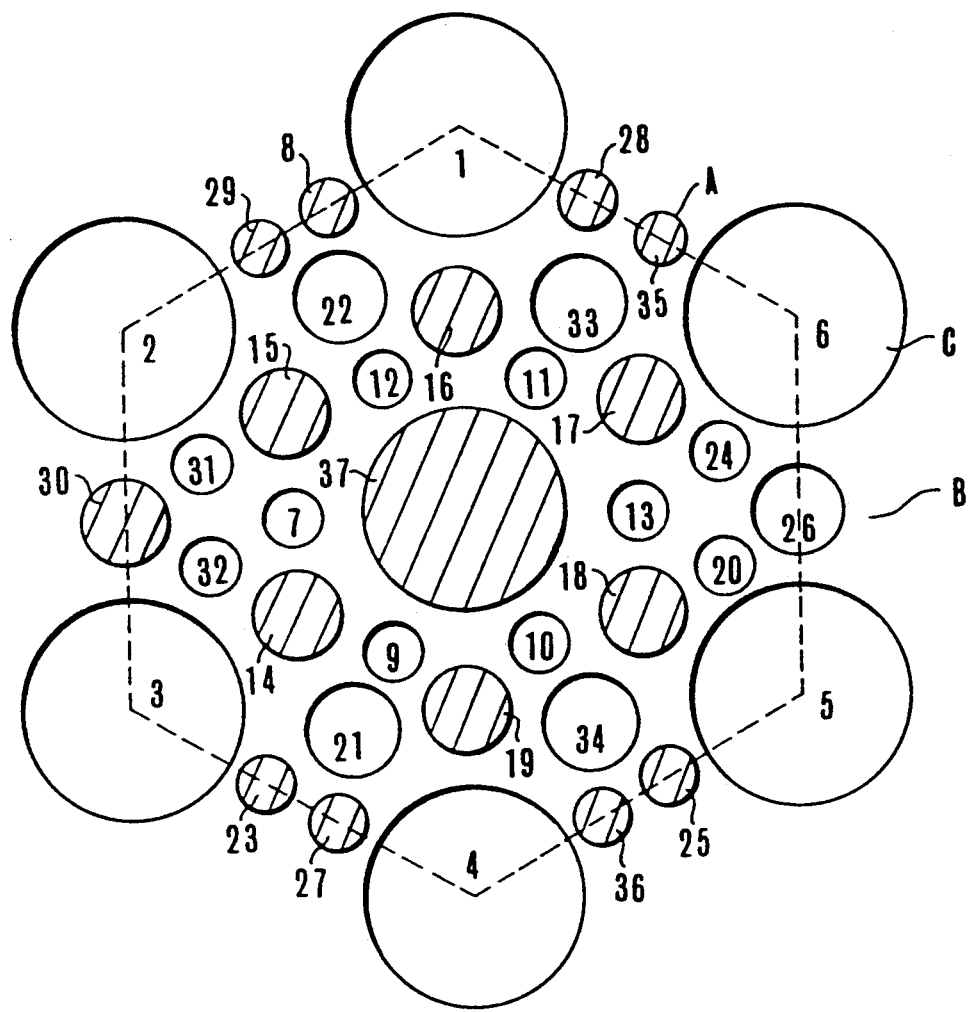
Figure 4:
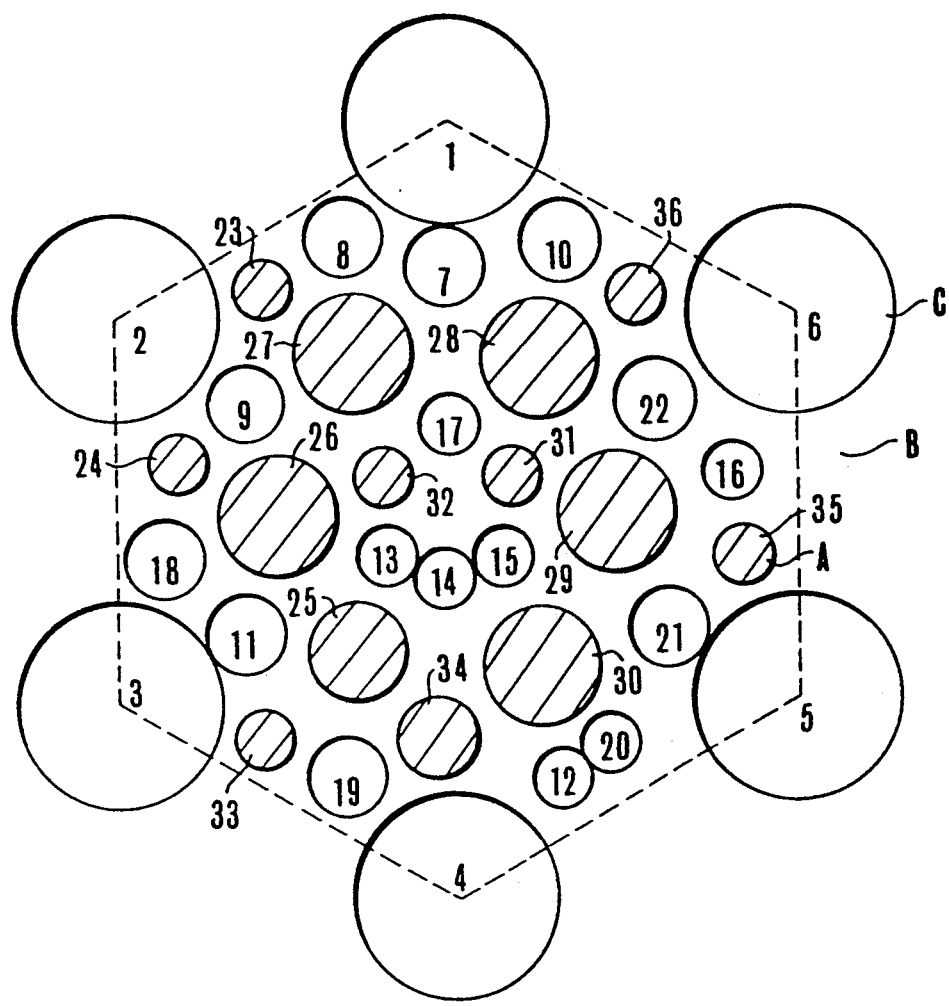
Figure 5:
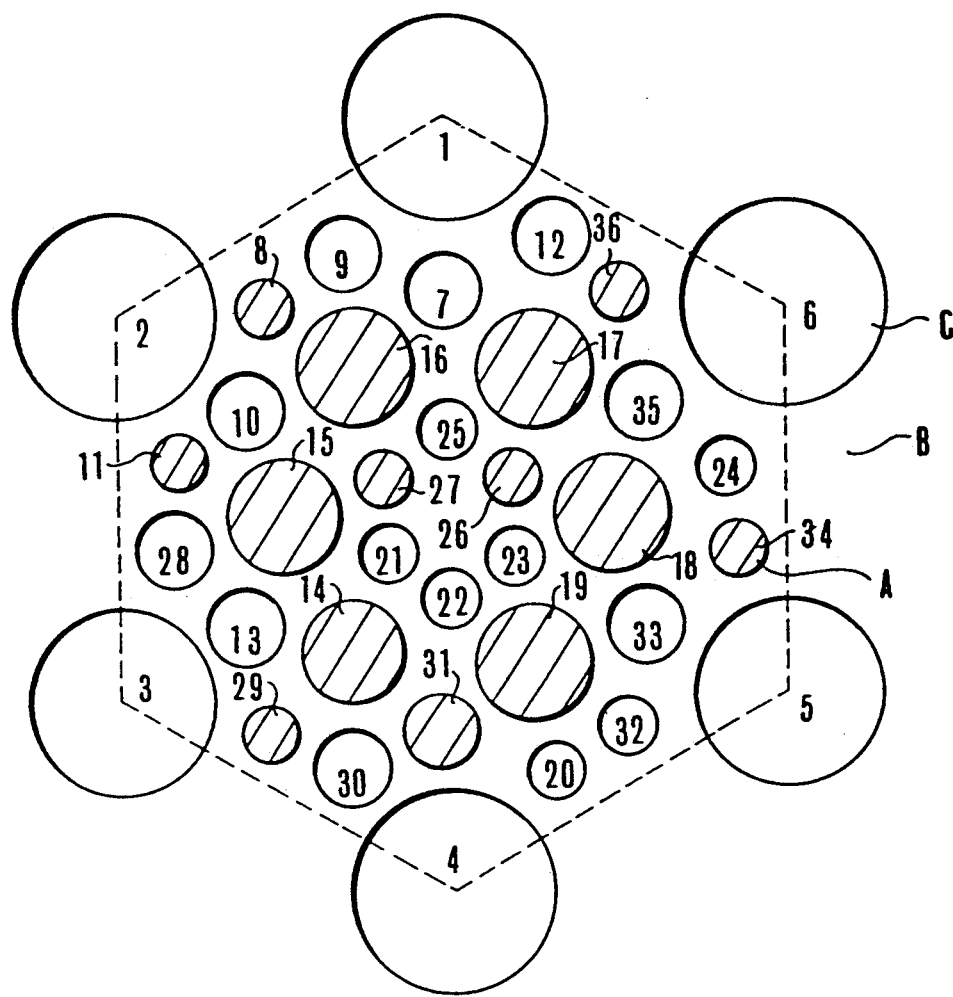
Figure 6:
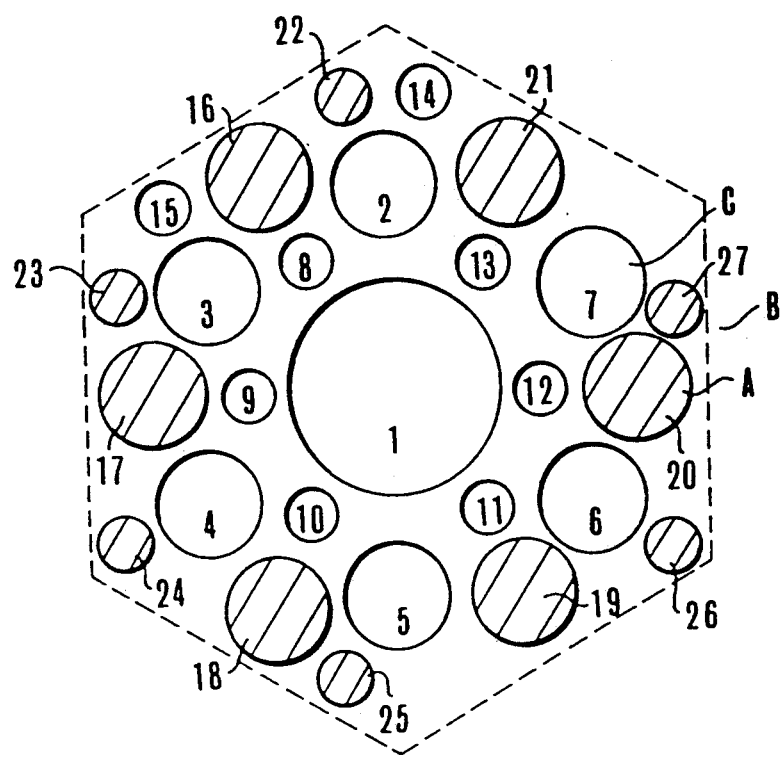
Figure 7:
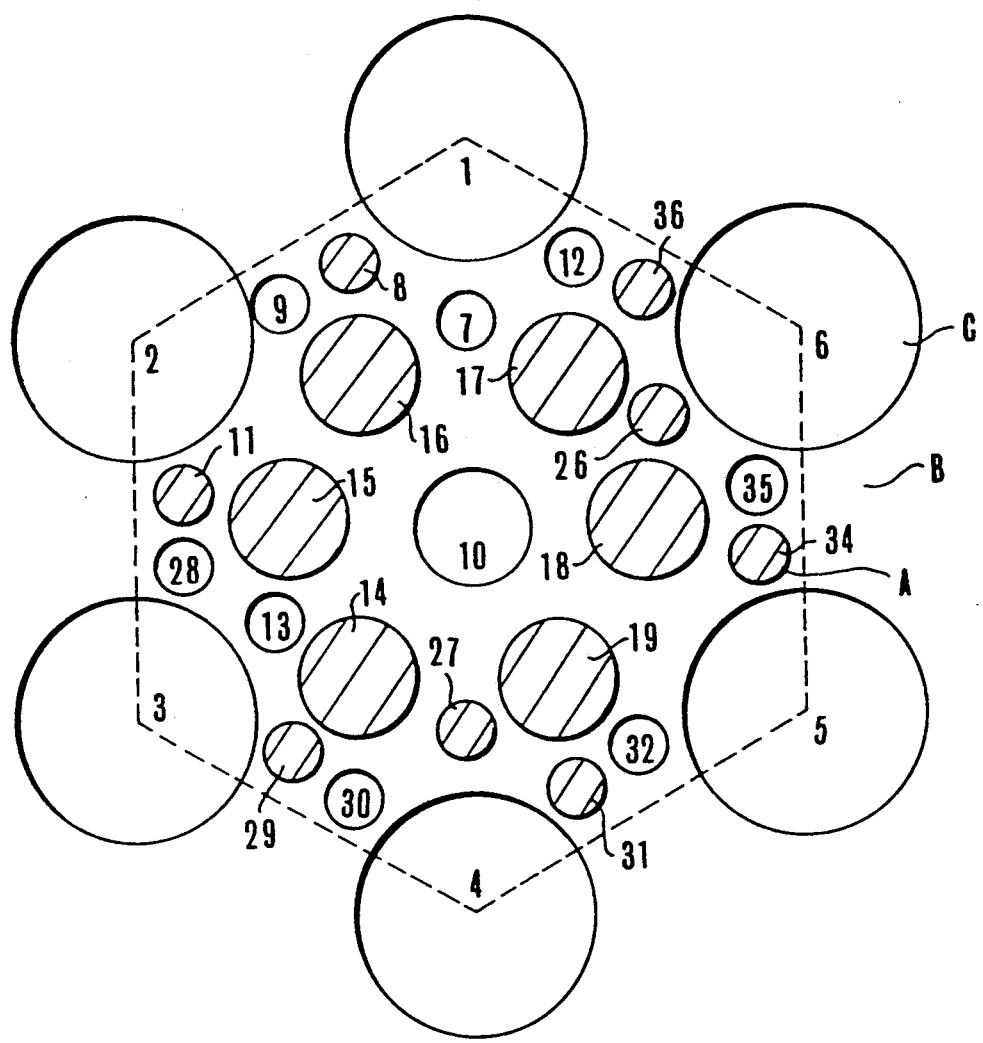
Figure 8:
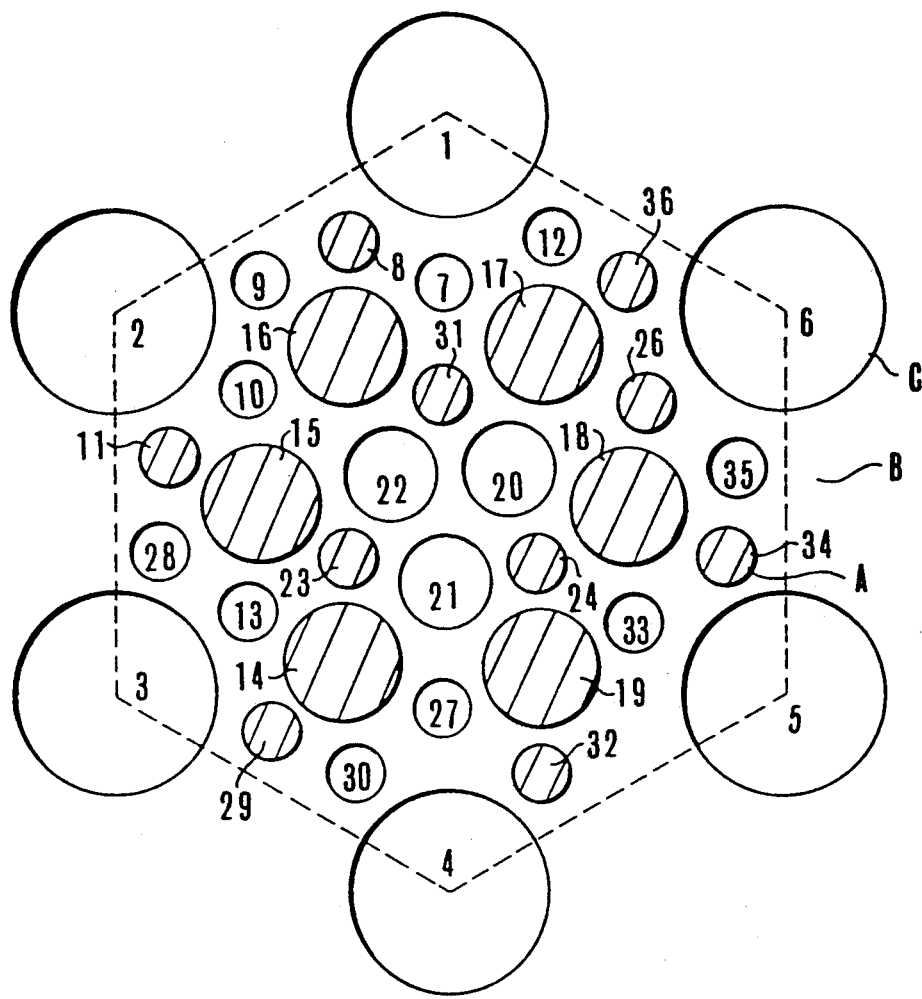

FIG. 1 through FIG. 8 each schematically show the main parts within a unit region of patterns in the focusing screen according to the present invention. The numerical data for these practical examples will be described later.

In every embodiment of the invention, the unit pattern region is supposed to be enclosed with an ideal block of regular hexagon (in actual practice, the lines of a the hexagon do not exist). The real focusing screen is formed with a great number of such hexagons arrayed on a surface of the base plate in a honeycomb fashion by a predetermined repetition pitch T, one of which is then shown here as the unit pattern regions. Incidentally, the focusing screen is positioned in a plane equivalent to the film plane of the camera.

In the same drawings, within a lattice of the unit pattern, there are provided plane portions A, B and C which, as a whole, form three heights. Of these, the plane portion A shown by the hatching and the white round plane portion C each are comprised of a plurality of minute patterns (circles) of independent convex portions or concave portions of of different sizes from one another. Incidentally, in the same drawings, some portions are drawn by the hatching, but they are virtually transparent.

In the same drawings, the plane portion B is a contiguous land pattern. So, the plane portion A shown by the hatching is comprised of the pattern of the convex portions relative to the plane portion B (reference plane B), while the plane portion C of white circle is comprised of the pattern of the concave portions relative to the plane portion B. The plane portions A and C are formed by using either the same or a different material as or from the material of the plane portion B. Incidentally, in the same drawings, they are labeled with sample numbers.

And, these three plane portions A, B and C give the respective bundles of light traveling thereacross different phase differences from one other. These light bundles are then diffracted and/or scattered, so that desired diffusion characteristics are obtained. In such a way, a so-called 3-level phase-type diffusing plate is made up.

It should be noted that the shape of the convex portions or concave portions of the plane portions A and C is not confined to the circle, but may be oval, rectangular or polygonal, or any other shapes may be used. It should also be noted that the plane portion A may otherwise be constructed with a pattern of concave portions, and the plane portion C with a pattern of convex portions.

Incidentally, the term "diameter" of the invention means, in the case where the plane is square, the diagonal, or, in the case of ellipse, the long axis.

In the present embodiment, each of the plane portions A and C is constructed from convex or concave portions of at least two different sizes with advantages that the color unevenness at the full open aperture of the stop is well corrected, and that the higher order diffracted light is increased to increase the intensity of the corner brightness when the stop is fully open, thus obtaining good diffusion characteristics.

In the present embodiment, of the patterns of the plane portion A, the patterns (convex portions) of the first or second largest size and, of the patterns of the plane portion C, the patterns (concave portions) of the first or second largest size are arranged in a ring-shaped manner as shown in FIG. 9 to FIG. 12.

Incidentally, FIG. 9 to FIG. 12 show the unit pattern region viewed from above with the plane portions A, B and C turned upward. The term "ring-shaped" manner used herein means an ideal ring-shaped region depicted with its center in coincidence with the center of the unit pattern region, in the present embodiment, at or near which the centers of the convex portions or concave portions of the first or second largest size constituting the plane portion A or plane portion C exist. And, calling the radius of a central circle of the ideal ring-shaped region depicted here "R", the centers of the ones of the circles in the plane portion A or the plane portion C which is of the first or second largest size fall in between a circle whose radius is 0.6R and another circle whose radius is 1.4R.

It is to be noted that in FIG. 9 to FIG. 12, the circles shown by the hatching are the plane portion A, the minute patterns of that plane portion A being the concave portion or convex portion relative to the plane portion (reference plane) B. The white circles are the minute patterns of the plane portion C, being the convex portion or concave portions relative to the plane portion B.

By this, the diffused light of "the plane portion A-plane portion B" and the diffused light of "the plane portion B-plane portion C" strengthen or weaken each other in good balance, thus obtaining point-symmetrical, natural diffusion characteristics.

Figure 9:
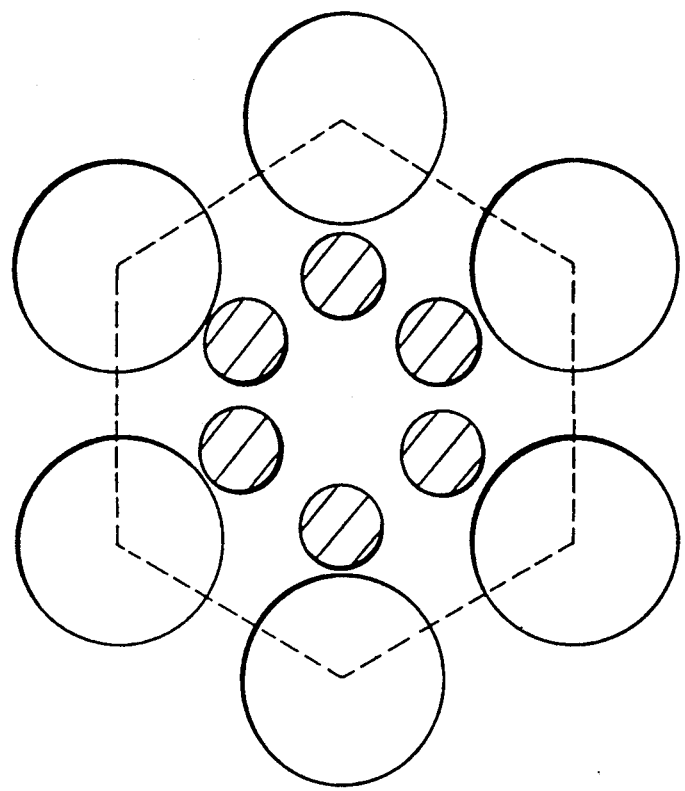
FIG. 9 through FIG. 12 are diagrams to explain the definition of a unit region in the focusing screen of the invention.

Particularly in the present embodiment, the unit pattern region is hexagonal, at each apex of which the relatively large minute pattern of concave form of the plane portion C is placed. Also, the relatively large minute pattern of convex form of the plane portion A is placed, as shown in FIG. 9, on each of the lines from the center of the hexagon to the respective apexes thereof. By this, the blurring state of the diffusing plate is improved and an improvement of the corner brightness at the full open aperture of the stop is achieved.

Figure 10:
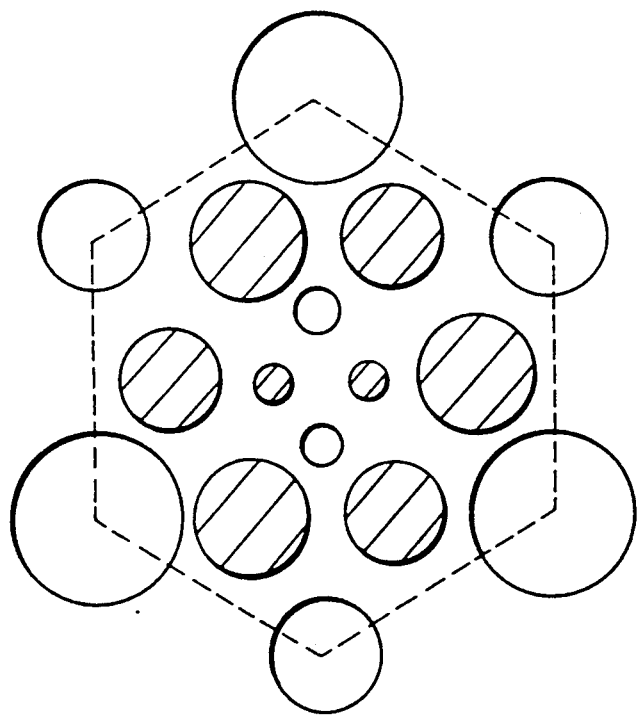

In FIG. 10, the relatively large minute pattern of convex form is placed in the direction toward the middle on the line segment between the adjacent two apexes of the hexagon to thereby well correct the color unevenness when the stop is fully open.

Figure 11:
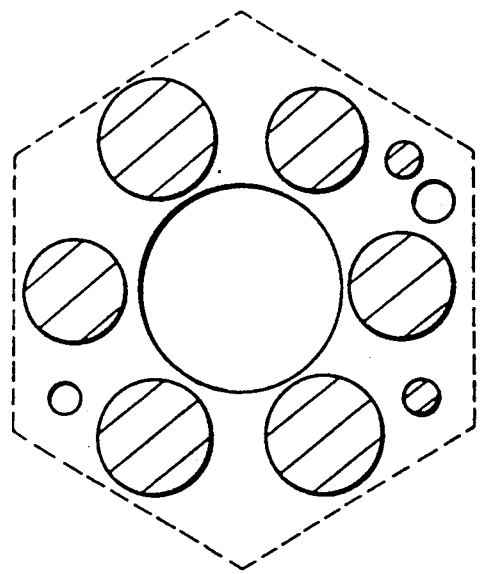
Figure 12:
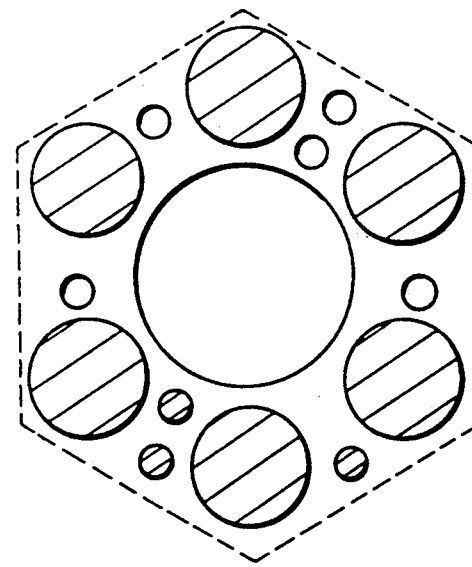

FIG. 11 and FIG. 12 have one largest minute pattern of concave form of the plane portion C placed at the center, around which the relatively large minute patterns of convex form of the plane portion A are arrayed to thereby well correct the color unevenness when the stop is fully open.

Next, the optical characteristics of the phase-type diffusing plate of the present embodiment are explained by using numerical equations.

For a diffracted light ray, u, in a ($\theta x$, $\theta y$) direction in the 3-level phase-type diffusing plate in the present embodiment, letting the wavelength of the incident ray be denoted by $\lambda$, the refractive indices in the x and y directions of the material of the base plate by $N_X$ and $N_Y$ respectively where $N_X = \sin\theta x/\lambda$ and $N_Y = \sin\theta y/\lambda$, and the phase distribution at the point (x,y) on the diffusing plate by $\phi(x,y)$, using the Fourier transform of the phase distribution, we obtain:

$$u(N_X, N_Y) \sim \int\int \exp(-i\phi(x,y)) \cdot \exp[-i2\pi(N_X \cdot x + N_Y \cdot y)] dx dy$$

Letting the height of the plane portion B from the plane portion A on the diffusing plate be denoted by $d_B$, the height of the plane portion C by $d_C$, the phases of all the plane portions are expressed as:

$$\phi(x, y)_A = 0,$$
$$\phi(x, y)_B = 2\pi(n - 1) \cdot d_B/\lambda$$
$$\phi(x, y)_C = 2\pi(n - 1) \cdot d_C/\lambda$$

Putting ($\theta x$, $\theta y$) = (0, 0) in the aforesaid equation, the intensity $I_0$ of the straight going light or 0th order diffracted light is calculated by $$I_0 = u \cdot u = (S_A + S_B \cdot e^{-i2\pi(n-1)d_B/\lambda} + S_C \cdot e^{-i2\pi(n-1)d_C/\lambda}) \cdot$$

$$(S_A + S_B \cdot e^{i2\pi(n-1)d_B/\lambda} + S_C \cdot e^{i2\pi(n-1)d_C/\lambda})$$

where $S_A$, $S_B$ and $S_C$ are respectively the ratios of the areas of the plane portions A, B and C to the entire area (wherein $S_A + S_B + S_C = 1$).

Rearrangement of the equation described above gives $$I_0 = 1 - 2S_A S_B \cdot \{1 - \cos(2\pi(n - 1) \cdot d_B/\lambda)\} - 2S_A S_C \cdot$$

$$\{1 - \cos(2\pi(n - 1) \cdot d_C/\lambda)\} - 2S_B S_C \cdot$$

$$\{1 - \cos(2\pi(n - 1) \cdot (d_C - d_B)/\lambda)\}$$

In this equation, the term $[2S_A S_B \cdot \{1 - \cos(2\pi(n-1) \cdot d_B/\lambda)\}]$ means the diffused light (diffracted light other than the 0th order one) as the waves of the light having passed through the plane portion A and the plane portion B interfere with each other, being diffracted sideward. The next terms also mean the diffused light as the waves of light are diffracted sideward by the interference between those having passed through the plane portions A and C and between those having passed through the plane portions B and C.

All the diffused light is the sum of the three terms. It will, therefore, be seen from the above equation that the intensity of the straight going light, or the 0th order diffracted light, takes the value obtained by subtracting all the diffused light from the total light amount or unity.

In such a way, the total diffused light is determined by the superposition of the three terms for the diffused light out of the light waves having passed through the plane portions A and B, the plane portions A and C and further the plane portions B and C. From this reason, in the present embodiment, the pitch of the unit pattern region, the disposition of the minute patterns of the plane portions A and C, the heights $d_B$ and $d_C$ of the plane portions B and C, and the area ratios $S_A$, $S_B$ and $S_C$ are properly chosen so as to cancel out the colorings. With this, the spectral characteristic of all the diffused light is made flat, and the spectral characteristic of the intensity of the 0th order diffracted light is made flat, too.

In the present embodiment, to remove the color unevenness at the time of the full open aperture of the stop and improve the blurring state, as are important for the diffusing plate to be used as the focusing screen, the patterns of the plane portions A, B and C are so set that the 0th order diffracted light gets as weak intensity and coloring as possible, and the coloring approaches whiteness.

For example, the combination of the area ratios of the plane portions A, B and C with the phase differences of "the plane portion A-plane portion B" and "the plane portion B-plane portion C" is made to lie in a predetermined range.

That is, the area ratio $S_B$ of the plane portion B lies in a range of 40 to 60% and becomes largest among the plane portions A, B and C. To this purpose, the plane portion B is made to be a contiguous land pattern so that the manufacturing is easy. By this, a phase-type diffusing plate of no color unevenness and good blurring state is obtained.

Particularly in the present embodiment, in order that the intensity of the 0th diffracted light and its color become as weak as possible and the color becomes close to white, letting the area ratios of the plane portions A and C be denoted by $S_A$ and $S_C$ respectively, the absolute value of the depth (height) of the plane portion A relative to the plane portion B by $d_1$, the absolute value of the depth (height) of the plane portion C relative to the plane portion B by $d_2$, and the refractive index for the d-line of the material of the base plate by $nd$, the following conditions are satisfied:

$$40(\%) \leq S_B \leq 60(\%)$$

$$15(\%) \leq S_A \leq 40(\%)$$

$$15(\%) \leq S_C \leq 40(\%)$$

$$0.15 \leq (nd-1)d_1 \leq 0.35$$

$$0.15 \leq (nd-1)d_2 \leq 0.35 \tag{1}$$

When these conditions are violated, the color unevenness is prominent in the neighborhood of the center when the stop is fully open, and, for use as the diffusing plate, it becomes difficult to observe with a good blurring state the diffusing plate.

It should be noted that in the present embodiment, if, as the area ratios $S_A$, $S_B$ and $S_C$ are in the relation $S_A + S_B + S_C = 1$, the plane portion relevant to the larger one of the area ratio $S_A$ and the area ratio $S_C$ is constructed with three or more kinds of minutes patterns, the color unevenness and the corner brightness at the time of the full open aperture of the stop can be further improved. So, this is preferable.

Next, the preferable unit pattern region and construction of the minute patterns are described successively.

At first, in the present embodiment, as the above-described unit pattern region is provided plural in number, letting the repetition pitch be denoted by T, or as both of the plane portion A and the plane portion C have the same repetition pitch, letting the repetition period be denoted by T, it is good to satisfy the following condition:

$$15 \ \mu m \leq T \leq 65 \ \mu m \tag{2}$$

If the periods T of the plane portion A and the plane portion C are not the same, large moiré is produced. And, when the period T is smaller than 15 μm, the minute patterns in the unit pattern region become too small to manufacture with ease. When the period T is larger than 65 μm, the use of it as the focusing screen leads to an appreciable granularity when the finder image is observed. So, that is no good.

Next, it is good that the aforesaid plane portion A and plane portion C both have at least one minute pattern whose diameter is not less than 4 μm as the largest.

This is because, if all the diameters of the minute patterns of both of the plane portion A and the plane portion C are 4 μm or below, the higher order diffracted light becomes strong, but the lower order diffracted light becomes too weak. When used as the focusing screen, it gets a dark field of view. So, that is not good. As to the blurring state, though the blurring is large, a core arises in the blurring. So, that is no good.

Particularly in the present embodiment, it is good to construct it in such a way that, letting the diameter of the largest of the circles of the plane portion A and the plane portion C be denoted by $2R_M$, the repetition period of the one of the plane portion A and the plane portion C which includes that largest circle by $T_M$, at least one pattern (circle) that satisfies:

$$0.2 \leq 2R_M T_M \tag{3}$$

exists in the plane portion A or the plane portion C. According to this, a bright focusing screen of better diffusion characteristics and blurring state is obtained.

Next, in the present embodiment, to further reduce the difference between the color of the central portion and the color of the marginal portion, letting the minimum of the distances from the boundary of any one of the minute patterns of the aforesaid plane portion A or plane portion C to the boundaries of the other minute patterns of the plane portion A or plane portion C be denoted by D, the minimum length (diameter) of the minute patterns of the plane portion A and plane portion C by Lmin, it is good to satisfy the following condition:

$$|D/Lmin| \leq 1 \tag{4}$$

When the patterns are too far from one another as violating this condition, a color unevenness arises when the stop is fully open. So, that is not good.

Figure 13:
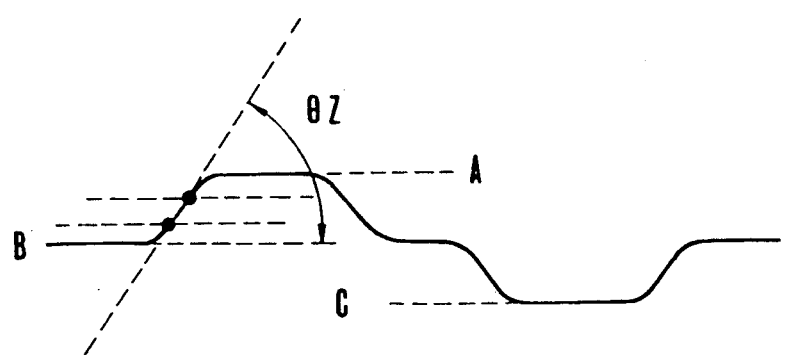
FIG. 13 is a fragmentary sectional view of the focusing screen according to the invention.

Also, in the present embodiment, when the patterns are being formed, the edge portions are positively softened (made slanted), as shown in FIG. 13. By this, the color unevenness at the full open aperture of the stop is further improved.

That is, in the present embodiment, letting the angle which the line connecting a point at 0.3 of a height of the step difference in the edge portion between the aforesaid minute pattern of the plane portion A or plane portion C and the aforesaid plane portion B to a point at 0.7 of that height makes with the plane portion B be denoted by $\theta z$, in the case that the diameter of the minute pattern of the plane portion A or plane portion C decreases with an increase of the distance from the plane portion B, the small absolute value of the angle is taken as the angle $\theta z$, or in the case of increasing, the large absolute value of the angle is taken as the angle $\theta z$, the following condition is satisfied:

$$20° \leq \theta z \leq 100° \quad (5)$$

When the lower limit of this condition (5) is violated, the color of the neighborhood of the center becomes rich in red when the stop is fully open and the entire area gets a red tint. When the upper limit is violated, the stepped portion becomes reverse in taper. Therefore, when the mold is made up and pressed to form molded articles, the resultant accuracy of transference is lower. So that is no good.

The numerical data for practical examples 1-8 of the invention are shown below.

The numerical data are the sample numbers of the minute patterns in the unit pattern region of regular hexagon, the values of the position coordinates X, Y (the center of the regular hexagon is taken as (0, 0)), and the values of the phase difference D (depth) with the plane portion B as the reference, and the values of the radius of curvature R of the pattern.

Incidentally, though, in the foregoing embodiment, the phase-type diffusing plate has been used as the focusing screen, the phase-type diffusing plate of the invention may be used as an optical filter having the predetermined diffusion characteristics.

Again, though the repetition shape of the unit pattern region has been made regular hexagonal, it is not confined to hexagon but may be square, triangle, or any other shapes whatever.

Practical Example 1 (Fig. 1)
One side of Hexagon: 0.025 mm; T = 0.043 mm

| Plane Portion | A | B | C |
|---|---|---|---|
| Depth | 0.00052 mm | 0 mm | −0.00052 mm |
| Area Ratio | 20.421% | 47.099% | 32.480% |

| No | X mm | Y mm | D mm | R mm |
|---|---|---|---|---|
| 1 | 0.000 | 0.024 | −0.00052 | 0.00675 |
| 2 | −0.021 | 0.012 | −0.00052 | 0.00675 |
| 3 | −0.021 | −0.012 | −0.00052 | 0.00675 |
| 4 | 0.000 | −0.025 | −0.00052 | 0.00675 |
| 5 | 0.021 | −0.012 | −0.00052 | 0.00675 |
| 6 | 0.021 | 0.012 | −0.00052 | 0.00675 |
| 7 | −0.005 | −0.000 | −0.00052 | 0.00187 |
| 8 | −0.008 | 0.020 | 0.00052 | 0.00187 |
| 9 | −0.002 | −0.004 | −0.00052 | 0.00187 |
| 10 | 0.002 | −0.004 | −0.00052 | 0.00187 |
| 11 | 0.002 | 0.004 | −0.00052 | 0.00187 |
| 12 | −0.002 | 0.004 | −0.00052 | 0.00187 |
| 13 | 0.004 | −0.000 | −0.00052 | 0.00187 |
| 14 | −0.009 | −0.005 | 0.00052 | 0.00344 |
| 15 | −0.009 | 0.005 | 0.00052 | 0.00344 |
| 16 | −0.000 | 0.010 | 0.00052 | 0.00344 |
| 17 | 0.008 | 0.004 | 0.00052 | 0.00344 |
| 18 | 0.009 | −0.005 | 0.00052 | 0.00344 |
| 19 | 0.000 | −0.010 | 0.00052 | 0.00344 |
| 20 | 0.015 | −0.001 | −0.00052 | 0.00287 |
| 21 | −0.006 | −0.014 | −0.00052 | 0.00287 |
| 22 | −0.006 | 0.014 | −0.00052 | 0.00287 |
| 23 | −0.013 | −0.017 | 0.00052 | 0.00187 |
| 24 | −0.015 | 0.003 | −0.00052 | 0.00187 |
| 25 | 0.021 | 0.002 | 0.00052 | 0.00187 |
| 26 | 0.012 | −0.017 | 0.00052 | 0.00187 |
| 27 | 0.021 | −0.002 | 0.00052 | 0.00187 |
| 28 | −0.008 | −0.019 | 0.00052 | 0.00187 |
| 29 | 0.008 | 0.020 | 0.00052 | 0.00187 |
| 30 | −0.012 | 0.017 | 0.00052 | 0.00187 |
| 31 | −0.021 | −0.002 | 0.00052 | 0.00187 |
| 32 | 0.005 | 0.015 | −0.00052 | 0.00187 |
| 33 | −0.015 | −0.002 | −0.00052 | 0.00287 |
| 34 | 0.010 | 0.012 | −0.00052 | 0.00287 |
| 35 | 0.006 | −0.014 | −0.00052 | 0.00287 |
| 36 | 0.011 | −0.011 | 0.00052 | 0.00187 |
| 37 | −0.012 | 0.017 | 0.00052 | 0.00187 |
| 38 | −0.021 | 0.002 | 0.00052 | 0.00187 |
| 39 | 0.008 | −0.020 | 0.00052 | 0.00187 |
| 40 | −0.012 | 0.011 | 0.00052 | 0.00187 |
| 41 | −0.012 | −0.011 | 0.00052 | 0.00187 |
| 42 | 0.015 | 0.005 | 0.00052 | 0.00187 |

Maximum Circle Diameter
(Convex): 6.8 μm
(Concave): 13.5 μm
|D/Lmin| = 0.33
$2R_M/T_M = 0.31$

Practical Example 2 (FIG. 2)
One side of Hexagon: 0.020 mm; T = 0.035 mm

| Plane Portion | A | B | C |
|---|---|---|---|
| Depth | 0.00052 mm | 0 mm | −0.00048 mm |
| Area Ratio | 21.015% | 43.974% | 35.011% |

| No | X mm | Y mm | D mm | R mm |
|---|---|---|---|---|
| 1 | 0.000 | 0.020 | −0.00048 | 0.00574 |
| 2 | −0.017 | 0.010 | −0.00048 | 0.00574 |
| 3 | −0.017 | −0.010 | −0.00048 | 0.00574 |
| 4 | 0.000 | −0.020 | −0.00048 | 0.00574 |
| 5 | 0.017 | −0.010 | −0.00048 | 0.00574 |
| 6 | 0.017 | 0.010 | −0.00048 | 0.00574 |
| 7 | −0.004 | −0.000 | −0.00048 | 0.00159 |
| 8 | −0.006 | 0.016 | −0.00048 | 0.00159 |
| 9 | −0.002 | −0.003 | −0.00048 | 0.00159 |
| 10 | 0.002 | −0.003 | −0.00048 | 0.00159 |
| 11 | 0.001 | 0.003 | −0.00048 | 0.00159 |
| 12 | −0.002 | 0.003 | −0.00048 | 0.00159 |
| 13 | 0.003 | −0.000 | −0.00048 | 0.00159 |
| 14 | −0.006 | −0.011 | −0.00048 | 0.00244 |
| 15 | −0.006 | 0.011 | −0.00048 | 0.00244 |
| 16 | −0.010 | −0.013 | −0.00048 | 0.00159 |
| 17 | 0.010 | −0.014 | −0.00048 | 0.00159 |
| 18 | 0.017 | −0.000 | −0.00048 | 0.00234 |
| 19 | 0.006 | 0.016 | −0.00048 | 0.00159 |
| 20 | −0.017 | −0.000 | −0.00048 | 0.00234 |
| 21 | 0.006 | 0.010 | −0.00048 | 0.00244 |
| 22 | 0.006 | −0.011 | −0.00048 | 0.00244 |
| 23 | −0.007 | −0.005 | 0.00052 | 0.00305 |
| 24 | −0.007 | 0.004 | 0.00052 | 0.00305 |
| 25 | −0.000 | 0.008 | 0.00052 | 0.00305 |
| 26 | 0.007 | 0.004 | 0.00052 | 0.00305 |
| 27 | 0.007 | −0.004 | 0.00052 | 0.00305 |
| 28 | 0.000 | −0.009 | 0.00052 | 0.00305 |
| 29 | 0.013 | −0.003 | 0.00052 | 0.00157 |
| 30 | 0.013 | −0.003 | 0.00052 | 0.00157 |
| 31 | −0.006 | −0.016 | 0.00052 | 0.00139 |
| 32 | −0.010 | 0.014 | 0.00052 | 0.00139 |
| 33 | −0.013 | 0.002 | 0.00052 | 0.00157 |
| 34 | −0.013 | −0.002 | 0.00052 | 0.00157 |
| 35 | 0.010 | 0.014 | 0.00052 | 0.00139 |
| 36 | 0.006 | −0.016 | 0.00052 | 0.00139 |

Maximum Circle Diameter
(Convex): 6.1 μm
(Concave): 11.5 μm
|D/Lmin| = 0.32
$2R_M/T_M = 0.33$ Practical Example 3 (FIG. 3)
One side of Hexagon: 0.020 mm; T = 0.035 mm

| Plane Portion | A | B | C |
|---|---|---|---|
| Depth | 0.00052 mm | 0 mm | −0.00050 mm |
| Area Ratio | 22.671% | 43.934% | 33.396% |

| No | X mm | Y mm | D mm | R mm |
|---|---|---|---|---|
| 1 | 0.000 | 0.020 | −0.00050 | 0.00560 |
| 2 | −0.017 | 0.010 | −0.00050 | 0.00560 |
| 3 | −0.017 | −0.010 | −0.00050 | 0.00560 |
| 4 | 0.000 | −0.020 | −0.00050 | 0.00560 |
| 5 | 0.017 | −0.010 | −0.00050 | 0.00560 |
| 6 | 0.017 | 0.010 | −0.00050 | 0.00560 |
| 7 | −0.008 | −0.000 | −0.00050 | 0.00155 |
| 8 | −0.006 | 0.016 | −0.00050 | 0.00155 |
| 9 | −0.003 | −0.007 | −0.00050 | 0.00155 |
| 10 | 0.003 | −0.006 | −0.00050 | 0.00155 |
| 11 | 0.003 | 0.006 | −0.00050 | 0.00155 |
| 12 | −0.004 | 0.007 | −0.00050 | 0.00155 |
| 13 | 0.009 | −0.000 | −0.00050 | 0.00155 |
| 14 | −0.008 | −0.005 | 0.00052 | 0.00224 |
| 15 | −0.009 | 0.005 | 0.00052 | 0.00224 |
| 16 | −0.000 | 0.010 | 0.00052 | 0.00224 |
| 17 | 0.009 | 0.005 | 0.00052 | 0.00224 |
| 18 | 0.009 | −0.005 | 0.00052 | 0.00224 |
| 19 | −0.000 | −0.010 | 0.00052 | 0.00224 |
| 20 | 0.013 | −0.003 | 0.00052 | 0.00160 |
| 21 | −0.006 | −0.011 | −0.00050 | 0.00240 |
| 22 | −0.006 | 0.011 | −0.00050 | 0.00240 |
| 23 | −0.010 | −0.013 | −0.00050 | 0.00155 |
| 24 | 0.013 | 0.003 | 0.00052 | 0.00150 |
| 25 | 0.010 | −0.014 | −0.00050 | 0.00155 |
| 26 | 0.017 | −0.000 | −0.00050 | 0.00230 |
| 27 | −0.006 | −0.016 | 0.00052 | 0.00140 |
| 28 | 0.006 | 0.016 | −0.00050 | 0.00155 |
| 29 | −0.010 | 0.014 | 0.00052 | 0.00140 |
| 30 | −0.017 | −0.000 | −0.00050 | 0.00230 |
| 31 | −0.013 | 0.002 | 0.00052 | 0.00160 |
| 32 | −0.013 | −0.002 | 0.00052 | 0.00150 |
| 33 | 0.006 | 0.010 | −0.00050 | 0.00240 |
| 34 | 0.006 | −0.011 | −0.00050 | 0.00240 |
| 35 | 0.010 | 0.014 | 0.00052 | 0.00140 |
| 36 | 0.006 | −0.016 | 0.00052 | 0.00140 |
| 37 | 0.000 | 0.000 | 0.00052 | 0.00560 |

Maximum Circle Diameter
(Convex): 11.2 μm
(Concave): 11.2 μm
|D/Lmin| = 0.36
$2R_M/T_M = 0.32$ Practical Example 4 (FIG. 4)
One side of Hexagon: 0.020 mm; T = 0.035 mm

| Plane Portion | A | B | C |
|---|---|---|---|
| Depth | 0.00052 mm | 0 mm | −0.00050 mm |
| Area Ratio | 21.786% | 45.548% | 32.666% |

| No | X mm | Y mm | D mm | R mm |
|---|---|---|---|---|
| 1 | 0.000 | 0.020 | −0.00050 | 0.00515 |
| 2 | −0.017 | 0.010 | −0.00050 | 0.00535 |
| 3 | −0.017 | −0.010 | −0.00050 | 0.00515 |
| 4 | 0.000 | −0.020 | −0.00050 | 0.00535 |
| 5 | 0.017 | −0.010 | −0.00050 | 0.00515 |
| 6 | 0.017 | 0.010 | −0.00050 | 0.00535 |
| 7 | −0.000 | 0.012 | −0.00050 | 0.00205 |
| 8 | −0.005 | 0.014 | −0.00050 | 0.00205 |
| 9 | −0.010 | 0.005 | −0.00050 | 0.00205 |
| 10 | 0.005 | 0.013 | −0.00050 | 0.00205 |
| 11 | −0.010 | −0.006 | −0.00050 | 0.00205 |
| 12 | 0.005 | −0.013 | −0.00050 | 0.00155 |
| 13 | −0.003 | −0.002 | −0.00050 | 0.00155 |
| 14 | −0.000 | −0.003 | −0.00050 | 0.00155 |
| 15 | 0.002 | −0.002 | −0.00050 | 0.00155 |
| 16 | 0.014 | 0.001 | −0.00050 | 0.00155 |
| 17 | 0.000 | 0.004 | −0.00050 | 0.00155 |
| 18 | −0.014 | −0.002 | −0.00050 | 0.00205 |
| 19 | −0.005 | −0.013 | −0.00050 | 0.00205 |
| 20 | 0.008 | −0.012 | −0.00050 | 0.00155 |
| 21 | 0.011 | −0.006 | −0.00050 | 0.00205 |
| 22 | 0.010 | 0.005 | −0.00050 | 0.00205 |
| 23 | −0.009 | 0.011 | 0.00052 | 0.00150 |
| 24 | −0.014 | 0.002 | 0.00052 | 0.00150 |
| 25 | −0.004 | −0.007 | 0.00052 | 0.00275 |
| 26 | −0.008 | −0.000 | 0.00052 | 0.00305 |
| 27 | −0.004 | 0.007 | 0.00052 | 0.00305 |
| 28 | 0.004 | 0.007 | 0.00052 | 0.00305 |
| 29 | 0.008 | 0.000 | 0.00052 | 0.00305 |
| 30 | 0.004 | −0.008 | 0.00052 | 0.00305 |
| 31 | 0.003 | 0.001 | 0.00052 | 0.00150 |
| 32 | −0.003 | 0.001 | 0.00052 | 0.00150 |
| 33 | −0.009 | −0.011 | 0.00052 | 0.00150 |
| 34 | −0.000 | −0.011 | 0.00052 | 0.00200 |
| 35 | 0.014 | −0.002 | 0.00052 | 0.00150 |
| 36 | 0.009 | 0.011 | 0.00052 | 0.00150 |

Maximum Circle Diameter
(Convex): 6.1 μm
(Concave): 10.7 μm
|D/Lmin| = 0
$2R_M/T_M = 0.31$ Practical Example 5 (FIG. 5)
One side of Hexagon: 0.035 mm; T = 0.061 mm

| Plane Portion | A | B | C |
|---|---|---|---|
| Depth | 0.00048 mm | 0 mm | −0.00054 mm |
|  | 21.786% | 45.548% | 32.666% |

| No | X mm | Y mm | D mm | R mm |
|---|---|---|---|---|
| 1 | 0.000 | 0.034 | −0.00054 | 0.00962 |
| 2 | −0.030 | 0.017 | −0.00054 | 0.00962 |
| 3 | −0.030 | −0.017 | −0.00054 | 0.00875 |
| 4 | 0.000 | −0.035 | −0.00054 | 0.00962 |
| 5 | 0.030 | −0.017 | −0.00054 | 0.00875 |
| 6 | 0.030 | 0.017 | −0.00054 | 0.00962 |
| 7 | 0.000 | 0.019 | −0.00054 | 0.00350 |
| 8 | −0.016 | 0.017 | 0.00048 | 0.00262 |
| 9 | −0.009 | 0.022 | −0.00054 | 0.00350 |
| 10 | −0.018 | 0.008 | −0.00054 | 0.00350 |
| 11 | −0.024 | 0.004 | 0.00048 | 0.00262 |
| 12 | 0.009 | 0.024 | −0.00054 | 0.00350 |
| 13 | −0.018 | −0.010 | −0.00054 | 0.00350 |
| 14 | −0.008 | −0.013 | 0.00048 | 0.00472 |
| 15 | −0.014 | −0.000 | 0.00048 | 0.00525 |
| 16 | −0.008 | 0.012 | 0.00048 | 0.00525 |
| 17 | 0.008 | 0.011 | 0.00048 | 0.00525 |
| 18 | 0.014 | −0.000 | 0.00048 | 0.00525 |
| 19 | 0.007 | −0.014 | 0.00048 | 0.00525 |
| 20 | 0.009 | −0.024 | −0.00054 | 0.00262 |
| 21 | −0.005 | −0.004 | −0.00054 | 0.00262 |
| 22 | 0.000 | −0.008 | −0.00054 | 0.00262 |
| 23 | 0.006 | −0.004 | −0.00054 | 0.00262 |
| 24 | 0.025 | 0.002 | −0.00054 | 0.00262 |
| 25 | 0.000 | 0.006 | −0.00054 | 0.00262 |
| 26 | 0.005 | 0.002 | 0.00048 | 0.00262 |
| 27 | −0.005 | 0.002 | 0.00048 | 0.00262 |
| 28 | −0.025 | −0.003 | −0.00054 | 0.00350 |
| 29 | −0.016 | −0.020 | 0.00048 | 0.00262 |
| 30 | −0.008 | −0.023 | −0.00054 | 0.00350 |
| 31 | −0.000 | −0.020 | 0.00048 | 0.00350 |
| 32 | 0.015 | −0.020 | −0.00054 | 0.00262 |
| 33 | 0.017 | −0.010 | −0.00054 | 0.00350 |
| 34 | 0.025 | −0.004 | 0.00048 | 0.00262 |
| 35 | 0.018 | 0.009 | −0.00054 | 0.00350 |
| 36 | 0.015 | 0.018 | 0.00048 | 0.00262 |

Maximum Circle Diameter
(Convex): 10.5 μm
(Concave): 19.2 μm
|D/Lmin| = 0.33
$2R_M/T_M = 0.32$ Practical Example 6 (FIG. 6)
One side of Hexagon: 0.015 mm; T = 0.026 mm

| Plane Portion | A | B | C |
|---|---|---|---|

-continued

| | | | |
|---|---|---|---|
| Depth | 0.00052 mm | 0 mm | −0.00050 mm |
| Area Ratio | 20.461% | 46.785% | 32.754% |

| No | X mm | Y mm | D mm | R mm |
|---|---|---|---|---|
| 1 | 0.000 | −0.000 | −0.00050 | 0.00450 |
| 2 | −0.000 | 0.008 | −0.00050 | 0.00225 |
| 3 | −0.007 | 0.004 | −0.00050 | 0.00225 |
| 4 | −0.007 | −0.004 | −0.00050 | 0.00225 |
| 5 | 0.000 | −0.008 | −0.00050 | 0.00225 |
| 6 | 0.008 | −0.004 | −0.00050 | 0.00225 |
| 7 | 0.008 | 0.004 | −0.00050 | 0.00225 |
| 8 | −0.003 | 0.005 | −0.00050 | 0.00112 |
| 9 | −0.006 | −0.000 | −0.00050 | 0.00112 |
| 10 | −0.003 | −0.005 | −0.00050 | 0.00112 |
| 11 | 0.003 | −0.005 | −0.00050 | 0.00112 |
| 12 | 0.006 | −0.000 | −0.00050 | 0.00112 |
| 13 | 0.004 | 0.005 | −0.00050 | 0.00112 |
| 14 | 0.001 | 0.012 | −0.00050 | 0.00112 |
| 15 | −0.009 | 0.007 | −0.00050 | 0.00112 |
| 16 | −0.005 | 0.008 | 0.00052 | 0.00225 |
| 17 | −0.010 | −0.000 | 0.00052 | 0.00225 |
| 18 | −0.005 | −0.009 | 0.00052 | 0.00225 |
| 19 | 0.005 | −0.008 | 0.00052 | 0.00225 |
| 20 | 0.010 | −0.000 | 0.00052 | 0.00225 |
| 21 | 0.005 | 0.008 | 0.00052 | 0.00225 |
| 22 | −0.001 | 0.012 | 0.00052 | 0.00112 |
| 23 | −0.011 | 0.004 | 0.00052 | 0.00112 |
| 24 | −0.011 | −0.006 | 0.00052 | 0.00112 |
| 25 | −0.002 | −0.001 | 0.00052 | 0.00112 |
| 26 | 0.011 | −0.006 | 0.00052 | 0.00112 |
| 27 | 0.011 | 0.002 | 0.00052 | 0.00112 |

Maximum Circle Diameter (Convex): 4.5 μm
(Concave): 9 μm
$|D/Lmin| = 0.07$
$2R_M/T_M = 0.35$ Practical Example 7 (FIG. 7)
One side of Hexagon: 0.020 mm; T = 0.035 mm

| Plane Portion | A | B | C |
|---|---|---|---|
| Depth | 0.00052 mm | 0 mm | −0.00050 mm |
| Area Ratio | 21.763% | 48.552% | 29.685% |

| No | X mm | Y mm | D mm | R mm |
|---|---|---|---|---|
| 1 | 0.000 | 0.019 | −0.00050 | 0.00600 |
| 2 | −0.017 | 0.009 | −0.00050 | 0.00600 |
| 3 | −0.017 | −0.009 | −0.00050 | 0.00600 |
| 4 | 0.000 | −0.020 | −0.00050 | 0.00600 |
| 5 | 0.017 | −0.010 | −0.00050 | 0.00600 |
| 6 | 0.017 | 0.010 | −0.00050 | 0.00600 |
| 7 | 0.000 | 0.010 | −0.00050 | 0.00150 |
| 8 | −0.006 | 0.013 | 0.00052 | 0.00150 |
| 9 | −0.009 | 0.011 | −0.00050 | 0.00150 |
| 10 | 0.000 | −0.000 | −0.00050 | 0.00300 |
| 11 | −0.014 | 0.001 | 0.00052 | 0.00150 |
| 12 | 0.005 | 0.013 | −0.00050 | 0.00150 |
| 13 | −0.010 | −0.004 | −0.00050 | 0.00150 |
| 14 | −0.005 | −0.007 | 0.00052 | 0.00300 |
| 15 | −0.009 | 0.000 | 0.00052 | 0.00300 |
| 16 | −0.005 | 0.007 | 0.00052 | 0.00300 |
| 17 | 0.005 | 0.007 | 0.00052 | 0.00300 |
| 18 | 0.009 | 0.000 | 0.00052 | 0.00300 |
| 19 | 0.004 | −0.008 | 0.00052 | 0.00300 |
| 26 | 0.009 | 0.005 | 0.00052 | 0.00150 |
| 27 | −0.000 | −0.010 | 0.00052 | 0.00150 |
| 28 | −0.014 | −0.001 | −0.00050 | 0.00150 |
| 29 | −0.009 | −0.011 | 0.00052 | 0.00150 |
| 30 | −0.006 | −0.014 | −0.00050 | 0.00150 |
| 31 | 0.005 | −0.013 | 0.00052 | 0.00150 |
| 32 | 0.006 | −0.011 | −0.00050 | 0.00150 |
| 34 | 0.015 | −0.001 | 0.00052 | 0.00150 |
| 35 | 0.014 | 0.001 | −0.00050 | 0.00150 |
| 36 | 0.009 | 0.012 | 0.00052 | 0.00150 |

Maximum Circle Diameter (Convex): 6 μm
(Concave): 12 μm
$|D/Lmin| = 0.33$
$2R_M/T_M = 0.34$ Practical Example 8 (FIG. 8)
One side of Hexagon: 0.020 mm; T = 0.035 mm

| Plane Portion | A | B | C |
|---|---|---|---|
| Depth | 0.00052 mm | 0 mm | −0.00050 mm |
| Area Ratio | 21.763% | 48.552% | 29.685% |

| No | X mm | Y mm | D mm | R mm |
|---|---|---|---|---|
| 1 | 0.000 | 0.019 | −0.00055 | 0.00540 |
| 2 | −0.017 | 0.009 | −0.00055 | 0.00540 |
| 3 | −0.017 | −0.009 | −0.00055 | 0.00540 |
| 4 | 0.000 | −0.020 | −0.00055 | 0.00540 |
| 5 | 0.017 | −0.010 | −0.00055 | 0.00540 |
| 6 | 0.017 | 0.010 | −0.00055 | 0.00540 |
| 7 | 0.000 | 0.011 | −0.00055 | 0.00150 |
| 8 | −0.005 | 0.013 | 0.00055 | 0.00150 |
| 9 | −0.009 | 0.011 | −0.00055 | 0.00150 |
| 10 | −0.010 | 0.005 | −0.00055 | 0.00150 |
| 11 | −0.014 | 0.002 | 0.00055 | 0.00150 |
| 12 | 0.005 | 0.013 | −0.00055 | 0.00150 |
| 13 | −0.010 | −0.005 | −0.00055 | 0.00150 |
| 14 | −0.005 | −0.008 | 0.00055 | 0.00300 |
| 15 | −0.009 | 0.000 | 0.00055 | 0.00300 |
| 16 | −0.005 | 0.008 | 0.00055 | 0.00300 |
| 17 | 0.005 | 0.008 | 0.00055 | 0.00300 |
| 18 | 0.009 | −0.000 | 0.00055 | 0.00300 |
| 19 | 0.004 | −0.008 | 0.00055 | 0.00300 |
| 20 | 0.003 | 0.001 | −0.00055 | 0.00250 |
| 21 | −0.000 | −0.004 | −0.00055 | 0.00250 |
| 22 | −0.003 | 0.001 | −0.00055 | 0.00250 |
| 23 | −0.005 | −0.002 | 0.00055 | 0.00150 |
| 24 | 0.004 | −0.003 | 0.00055 | 0.00150 |
| 26 | 0.010 | 0.005 | 0.00055 | 0.00150 |
| 27 | −0.000 | −0.010 | −0.00055 | 0.00150 |
| 28 | −0.015 | −0.002 | −0.00055 | 0.00150 |
| 29 | −0.009 | −0.011 | 0.00055 | 0.00150 |
| 30 | −0.004 | −0.013 | −0.00055 | 0.00150 |
| 31 | −0.000 | 0.005 | 0.00055 | 0.00150 |
| 32 | 0.004 | −0.013 | 0.00055 | 0.00150 |
| 33 | 0.009 | −0.006 | −0.00055 | 0.00150 |
| 34 | 0.014 | −0.002 | 0.00052 | 0.00150 |
| 35 | 0.014 | 0.001 | −0.00055 | 0.00150 |
| 36 | 0.009 | 0.011 | 0.00055 | 0.00150 |

Maximum Circle Diameter (Convex): 6 μm
(Concave): 10.8 μm
$|D/Lmin| = 0.33$
$2R_M/T_M = 0.31$ Another form of the invention featuring a concrete arrangement of the convex portions or concave portions relative to the reference plane, and its practical examples are described below.

At first, referring to FIG. 14 through FIG. 17, features for the desired pattern arrangement of the convex portions or concave portions are described. Also, in the practical examples, the hexagonal block shown by dashed lines represents the unit region. This unit lattice, likewise as in the before-described practical examples, has a plurality of convex portions (black portions) which are different in height from the reference plane (white portion) or have a first height and different in diameter from one another, and has a plurality of concave portions (hatched portion) having a second height and different in diameter from one another. Letting the diameters of the convex portions be denoted by $2R_{Ai}$ (i=1, 2, ...) respectively, the diameters of the concave portions by $2R_{Ci}$ (i=1, 2, ...), the maximum of the diameters $2R_{Ai}$ by $2R_{AM}$, the maximum of the diameters $2R_{Ci}$ by $2R_{CM}$, and the distance from the center of the unit lattice to the center of the farther one of the convex and concave portions than the other by R, the convex portions or the concave portions are arranged so that of the convex portions or concave portions which satisfy at least either one of the following conditions:

$$0.8 R_{AM} \leq R_{Ai} \quad (6)$$

$$0.8 R_{CM} \leq R_{Ci} \quad (7)$$

at least three have their centers arranged to exist in a ring-shaped region of from 0.6R to 1.4R. Particularly in the present embodiment, as the unit lattice is of the hexagonal shape, with regard to the correspondence with the number of virtual apexes, six such portions are provided.

Figure 14:
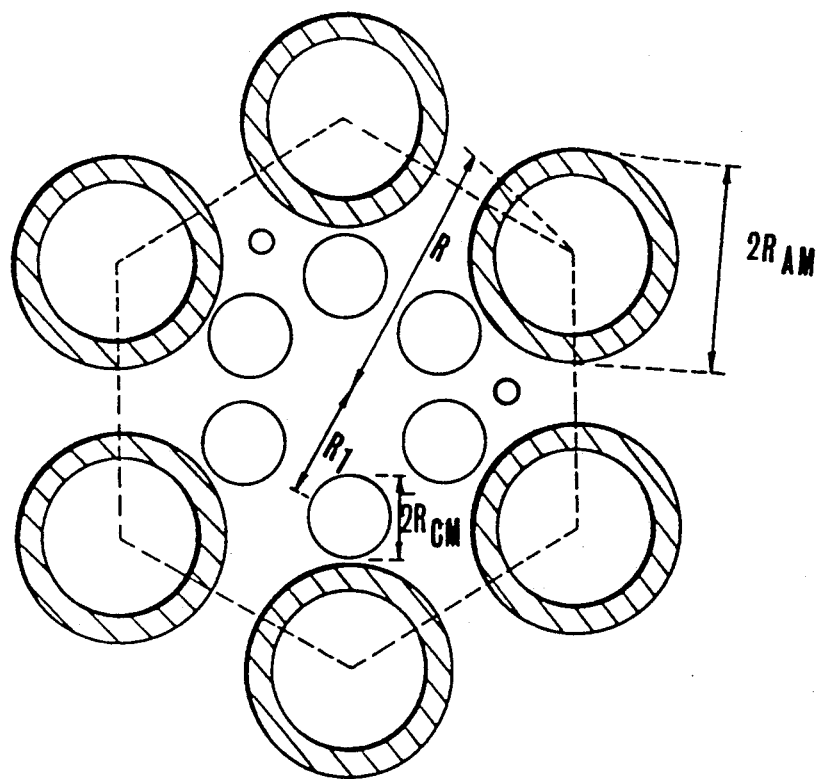
FIGS. 14 to 17 are diagrams to explain the unit region of the focusing screen according to the invention.

FIG. 14 shows six circles (hatched portions) of maximum size in C level whose centers lie at or near the apexes of the unit lattice and another six circles (black circles) of maximum size in A level which lie within the unit lattice. And, each of these circles exists in the ring-shaped region that satisfies the above-described condition. Again, the black circles have their centers arranged to lie in the respective lines radially extending to the apexes of the hexagon, and those circles which lie on the apexes of the hexagon are made to have a ring structure (the hatched portion).

Figure 15:
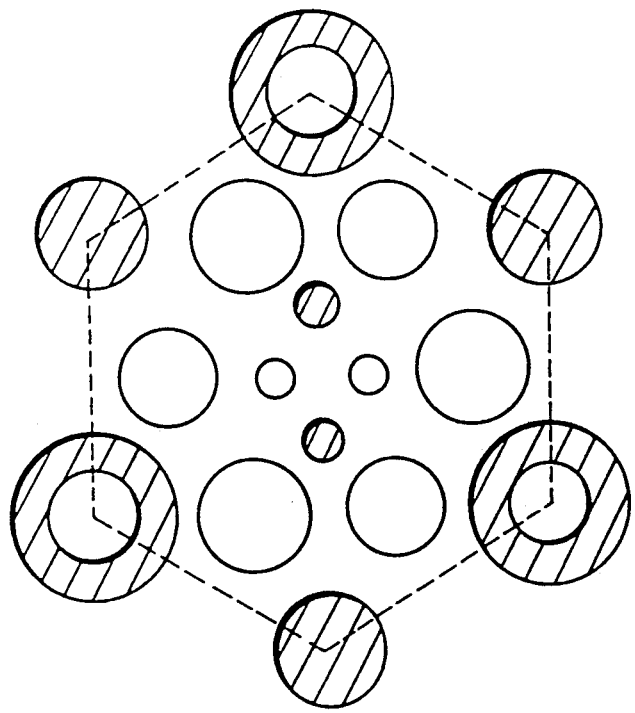

FIG. 15 shows three large circles (hatched portions) on the respective apexes of a hexagon and six large circles (black circles) made to exist in the ring-shaped region. Again, the six black circles (convex portions) are made to lie in the respective lines radially extending to the centers in between the adjacent apexes of the hexagon, and the three large circles (hatched portions) are made to have a one-ring structure.

Figure 16:
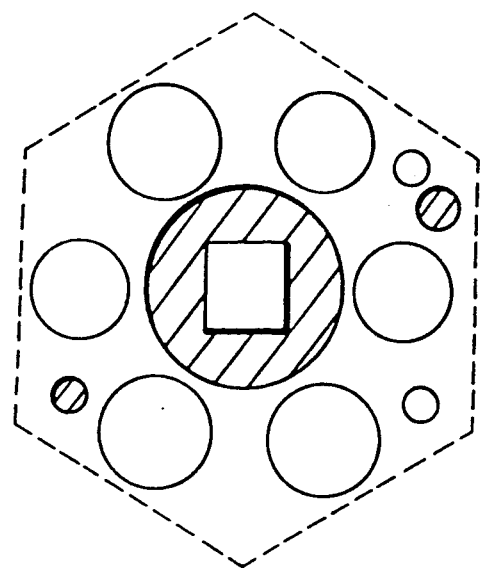
Figure 17:
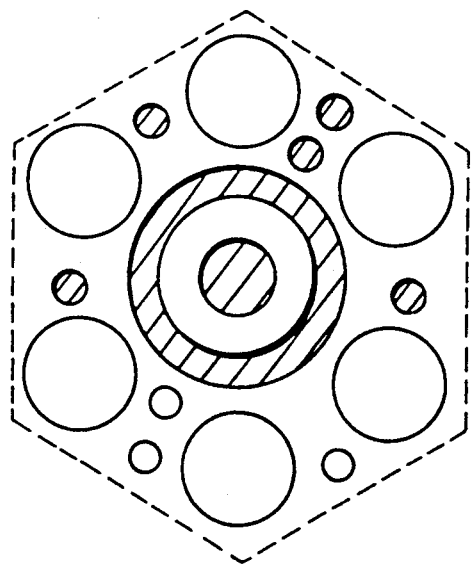

FIGS. 16 and 17 each show one maximum circle (hatched circle) of C level whose center coincides with the center of a regular hexagon and six circles (black circles) of maximum size in A level made to get a ring structure. In particular, in FIG. 16, the six convex portions shown black are arrayed with their centers in the respective lines radially extending to the centers in between the adjacent two apexes of the hexagon, and, in FIG. 17, in the respective lines radially extending to the apexes of the hexagon. Further, the arrangement of FIG. 16 has a single-ring structure at the center, and the arrangement of FIG. 17 has a double-ring structure.

Also, in the present embodiment, for the above-described $R_{AM}$ and $R_{CM}$, it is preferred to satisfy the following condition:

$$0.1 \leq R_{AM}/R_{CM} \leq 4.0 \quad (8)$$

When below the lower limit of the above-described condition, the minute patterns of C level become large, so that it becomes impossible to secure large minute patterns in A level. Therefore, the color unevenness at the time of the full open aperture of the stop deteriorates. Conversely when above the upper limit, the minute patterns of A level can be made large, but the minute patterns of C level all become small. As a result, the diffusing distribution becomes too wide so that the corner brightness at the time of the full open aperture of the stop drops.

As to the ring structure, letting the longest length (diameter) of the outermost minute pattern of the ring minute pattern be denoted by $2R_L$, the length (diameter) of the minute pattern having the largest diameter among the minute patterns of this $2R_L$ by $2R_M$, and the length of the minute pattern having the second largest length by $2R_S$, it is desirable to satisfy the following conditions:

$$0.1 < R_M/R_L \quad (9)$$

$$0.1 < R_S/R_M \quad (10)$$

When below the lower limit of the condition (9), the circle of $R_L$ becomes too large so that it is impossible to array the minute patterns of A and C levels in a good area ratio. When below the lower limit of the condition (10), the circle of $R_S$ becomes small, so that it becomes difficult to reproduce the circle of $R_S$ during manufacturing.

Figure 18A:
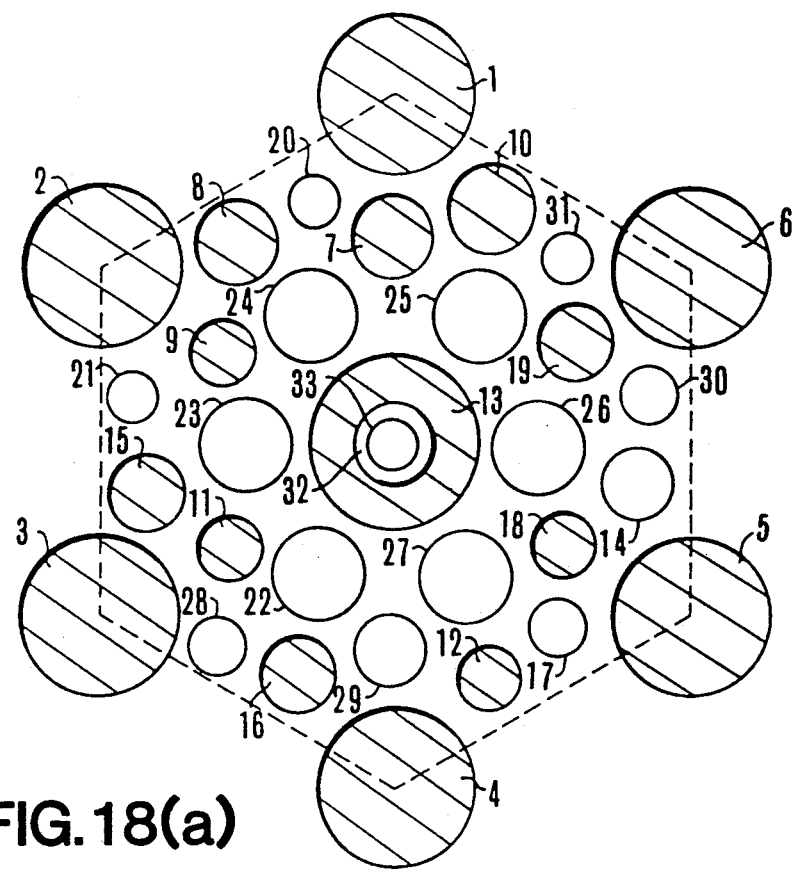
FIGS. 18(a) and 18(b), FIGS. 19(a) and 19(b), FIGS. 20(a) and 20(b) and FIGS. 21(a) and 21(b) are schematic diagrams and isophones of numerical examples 9 to 12 of diffusing plates of the invention showing how the convex and concave portions are distributed over the unit region.
Figure 18B:
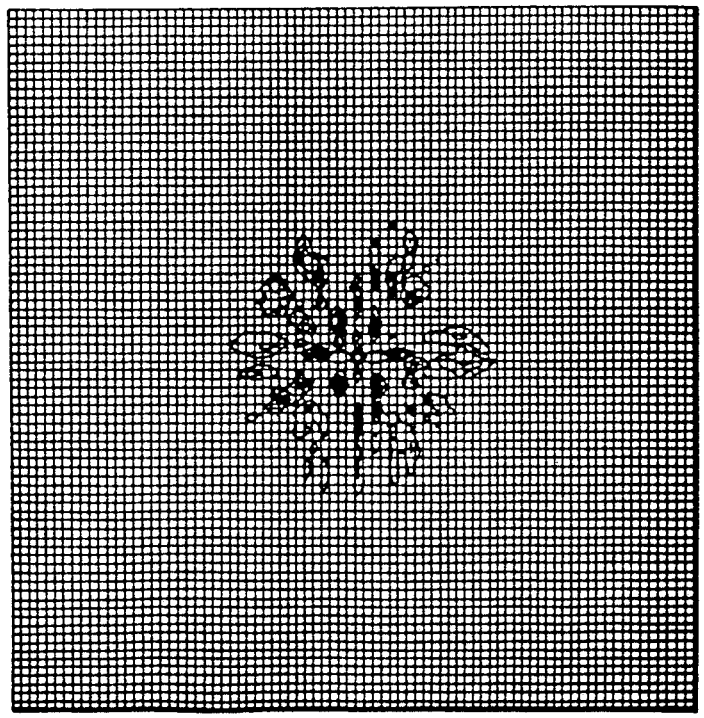

Practical Example 9 (FIGS. 18(a) and 18(b))
The length of one side of regular hexagon: 20 μm
Period T = 35 μm

| Plane Portion | A | B | C |
|---|---|---|---|
| Depth D (mm) | 0.00050 | 0 | −0.00048 |
| Area Ratio (%) | 22.5 | 44.3 | 33.2 |

| No | X mm | Y mm | D mm | R mm |
|---|---|---|---|---|
| 1 | 0.00000 | 0.02000 | −0.00048 | 0.00469 |
| 2 | −0.01745 | 0.00999 | −0.00048 | 0.00469 |
| 3 | −0.01739 | −0.00999 | −0.00048 | 0.00469 |
| 4 | 0.00001 | −0.01997 | −0.00048 | 0.00469 |
| 5 | 0.01734 | −0.00999 | −0.00048 | 0.00455 |
| 6 | 0.01728 | 0.00992 | −0.00048 | 0.00455 |
| 7 | −0.00018 | 0.01175 | −0.00048 | 0.00238 |
| 8 | −0.00948 | 0.01137 | −0.00048 | 0.00238 |
| 9 | −0.01029 | 0.00509 | −0.00048 | 0.00188 |
| 10 | 0.00566 | 0.01338 | −0.00048 | 0.00259 |
| 11 | −0.00979 | −0.00616 | −0.00048 | 0.00188 |
| 12 | 0.00566 | −0.01363 | −0.00048 | 0.00188 |
| 13 | −0.00005 | 0.00000 | −0.00048 | 0.00505 |
| 14 | 0.01427 | −0.00226 | 0.00050 | 0.00215 |
| 15 | −0.01462 | −0.00301 | −0.00048 | 0.00222 |
| 16 | −0.00571 | −0.01338 | −0.00048 | 0.00222 |
| 17 | 0.00962 | −0.01061 | 0.00050 | 0.00162 |
| 18 | 0.00999 | −0.00584 | −0.00048 | 0.00194 |
| 19 | 0.01068 | 0.00571 | −0.00048 | 0.00225 |
| 20 | −0.00483 | 0.01388 | 0.00050 | 0.00160 |
| 21 | −0.01539 | 0.00268 | 0.00050 | 0.00160 |
| 22 | −0.00439 | −0.00747 | 0.00050 | 0.00281 |
| 23 | −0.00885 | −0.00019 | 0.00050 | 0.00281 |
| 24 | −0.00502 | 0.00722 | 0.00050 | 0.00281 |
| 25 | 0.00497 | 0.00722 | 0.00050 | 0.00281 |
| 26 | 0.00855 | −0.00025 | 0.00050 | 0.00281 |
| 27 | 0.00434 | −0.00772 | 0.00050 | 0.00281 |
| 28 | −0.01044 | −0.01158 | 0.00050 | 0.00160 |
| 29 | −0.00012 | −0.01187 | 0.00050 | 0.00215 |
| 30 | 0.01494 | 0.00281 | 0.00050 | 0.00160 |
| 31 | 0.01005 | 0.01065 | 0.00050 | 0.00160 |
| 32 | 0.00000 | 0.00000 | 0.00000 | 0.00244 |
| 33 | 0.00000 | 0.00000 | 0.00050 | 0.00147 |

1. $R_{CM}$ = 0.0028 mm - R of Ideal Circle = 0.0087 mm - Number of $R_{Ci}$ = 6
   $R_{AM}$ = 0.00505 mm - R of Ideal Circle = 0 mm
2. $R_{AM}/R_{CM}$ = 1.80
3. $R_M/R_L$ = 0.48
   $R_S/R_M$ = 0.60

Figure 19A:
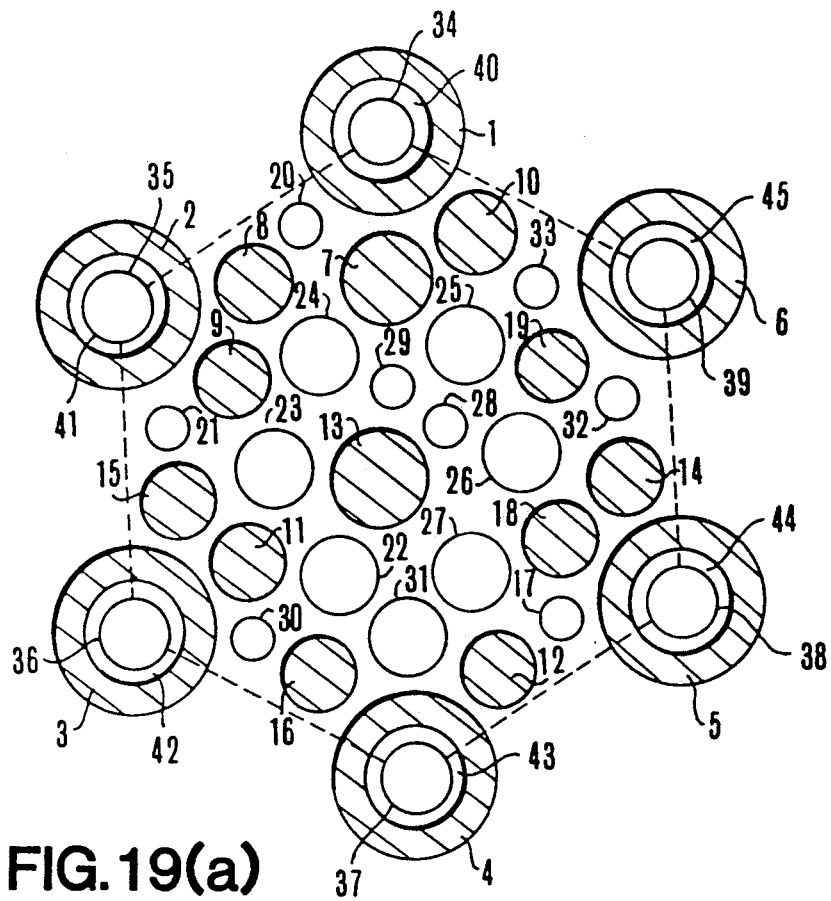
Figure 19B:
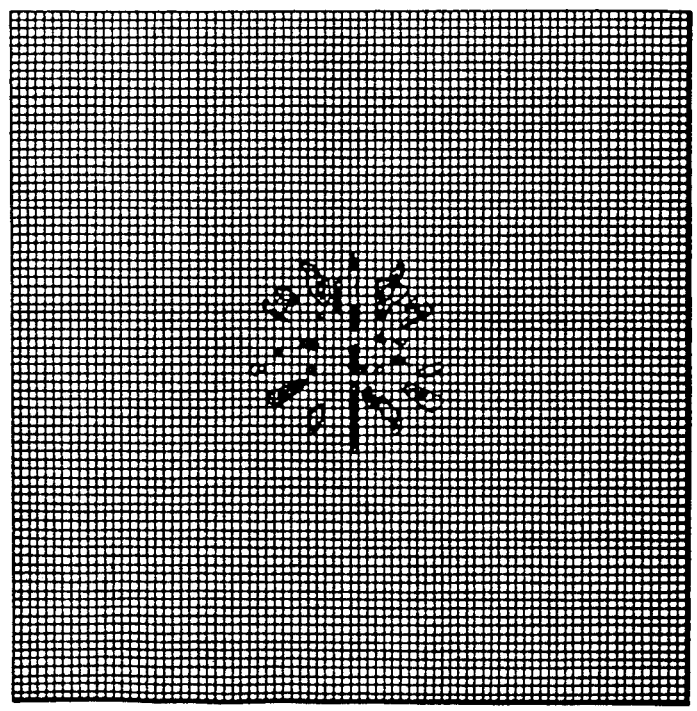

Practical Example 10 (FIGS. 19(a) and 19(b))
One side of Hexagon: 25 μm; T = 43 μm

| Plane Portion | A | B | C |
|---|---|---|---|
| Depth | 0.0005 mm | 0 mm | −0.00048 mm |
| Area Ratio | 22.5% | 44.2% | 33.3% |

| No | X mm | Y mm | D mm | R mm |
|---|---|---|---|---|
| 1 | 0.00000 | 0.02500 | −0.00048 | 0.00647 |
| 2 | −0.02162 | 0.01250 | −0.00048 | 0.00672 |
| 3 | −0.02162 | −0.01250 | −0.00048 | 0.00647 |
| 4 | 0.00000 | −0.02500 | −0.00048 | 0.00672 |
| 5 | 0.02162 | −0.01250 | −0.00048 | 0.00647 |
| 6 | 0.02162 | 0.01250 | −0.00048 | 0.00672 |

-continued

| | | | | |
|---|---|---|---|---|
| 7 | −0.00023 | 0.01358 | −0.00048 | 0.00358 |
| 8 | −0.01067 | 0.01382 | −0.00048 | 0.00295 |
| 9 | −0.01286 | 0.00636 | −0.00048 | 0.00295 |
| 10 | 0.00707 | 0.01672 | −0.00048 | 0.00321 |
| 11 | −0.01224 | −0.00769 | −0.00048 | 0.00295 |
| 12 | 0.00707 | −0.01703 | −0.00048 | 0.00295 |
| 13 | −0.00156 | −0.00196 | −0.00048 | 0.00390 |
| 14 | 0.01783 | −0.00283 | −0.00048 | 0.00295 |
| 15 | −0.01757 | −0.00275 | −0.00048 | 0.00295 |
| 16 | −0.00713 | −0.01672 | −0.00048 | 0.00295 |
| 17 | 0.01202 | −0.01327 | 0.00050 | 0.00195 |
| 18 | 0.01249 | −0.00730 | −0.00048 | 0.00295 |
| 19 | 0.01249 | 0.00612 | −0.00048 | 0.00270 |
| 20 | −0.00666 | 0.01837 | 0.00050 | 0.00192 |
| 21 | −0.01805 | 0.00314 | 0.00050 | 0.00192 |
| 22 | −0.00517 | −0.00918 | 0.00050 | 0.00308 |
| 23 | −0.00988 | −0.00055 | 0.00050 | 0.00327 |
| 24 | −0.00580 | 0.00809 | 0.00050 | 0.00327 |
| 25 | 0.00582 | 0.00809 | 0.00050 | 0.00327 |
| 26 | 0.00974 | −0.00039 | 0.00050 | 0.00327 |
| 27 | 0.00535 | −0.00942 | 0.00050 | 0.00327 |
| 28 | 0.00387 | 0.00200 | 0.00050 | 0.00192 |
| 29 | −0.00015 | 0.00526 | 0.00050 | 0.00192 |
| 30 | −0.01224 | −0.01358 | 0.00050 | 0.00192 |
| 31 | −0.00023 | −0.01421 | 0.00050 | 0.00295 |
| 32 | 0.01752 | 0.00330 | 0.00050 | 0.00192 |
| 33 | 0.01178 | 0.01248 | 0.00050 | 0.00192 |
| 34 | −0.00007 | 0.02488 | 0.00050 | 0.00276 |
| 35 | −0.02173 | 0.01264 | 0.00050 | 0.00276 |
| 36 | −0.02158 | −0.01272 | 0.00050 | 0.00276 |
| 37 | 0.00001 | −0.02520 | 0.00050 | 0.00276 |
| 38 | 0.02160 | −0.01256 | 0.00050 | 0.00276 |
| 39 | 0.02168 | 0.01248 | 0.00050 | 0.00276 |
| 40 | 0.00001 | 0.02488 | 0.00000 | 0.00394 |
| 41 | −0.02173 | 0.01256 | 0.00000 | 0.00394 |
| 42 | −0.02158 | −0.01272 | 0.00000 | 0.00394 |
| 43 | 0.00000 | −0.02528 | 0.00000 | 0.00394 |
| 44 | 0.02144 | −0.01256 | 0.00000 | 0.00394 |
| 45 | 0.02160 | 0.01240 | 0.00000 | 0.00394 |

1. $R_{CM}$ = 0.00327 mm - R of Ideal Circle = 0.010 mm - Number of $R_{Ci}$ = 6
   $R_{AM}$ = 0.00672 mm - R of Ideal Circle = 0.025 mm - Number of $R_{Ai}$ = 6
2. $R_{AM}/R_{CM}$ = 2.06
3. $R_M/R_L$ = 0.59
   $R_S/R_M$ = 0.70

Figure 20A:
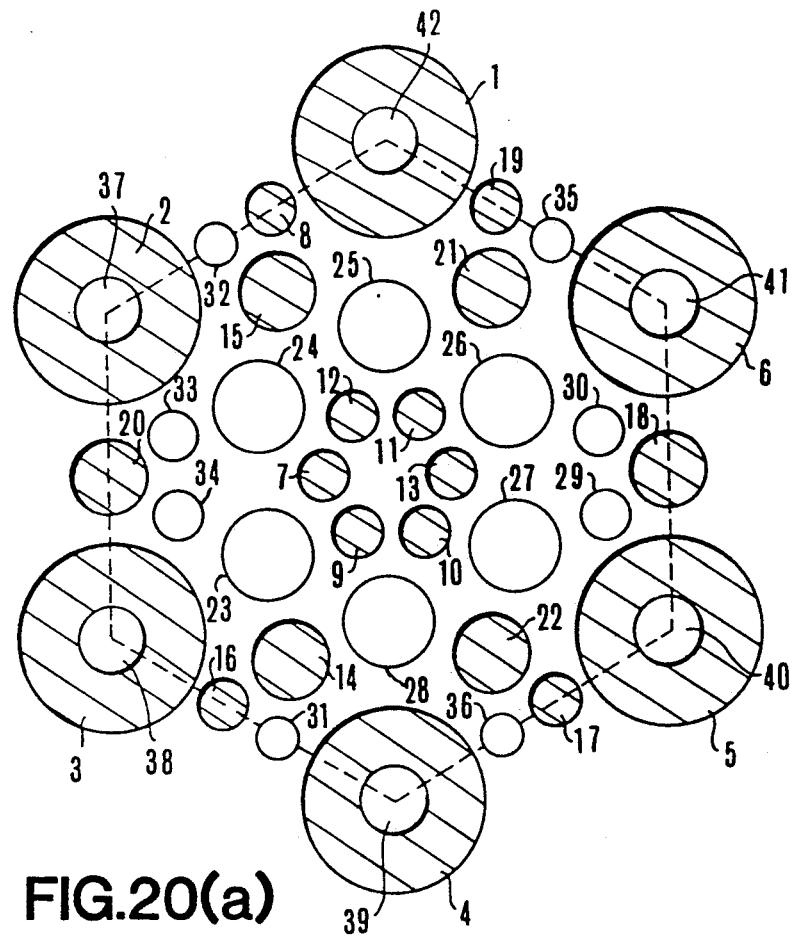
Figure 20B:
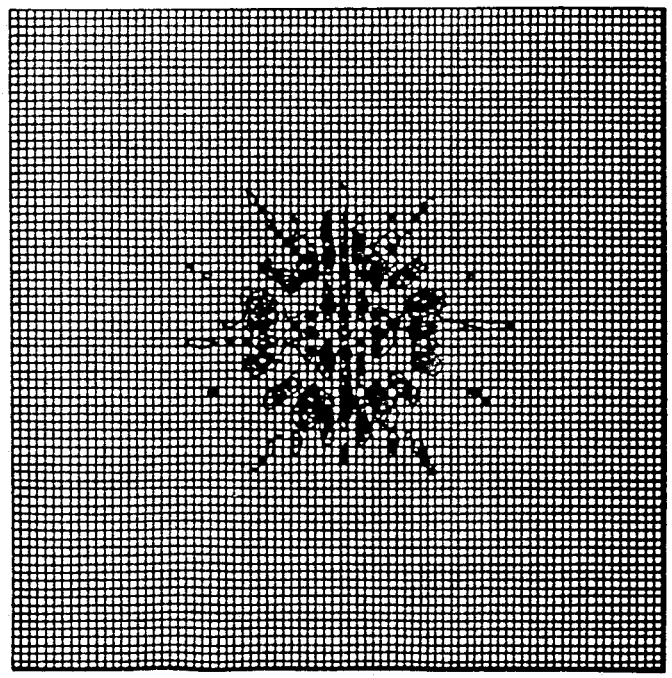

Practical Example 11 (FIGS. 20(a) and 20(b))
One side of Hexagon: 20 μm; T = 35 μm

| Plane Portion | A | B | C |
|---|---|---|---|
| Depth | 0.00052 mm | 0 mm | −0.00050 mm |
| Area Ratio | 22.5% | 43.9% | 33.6% |

| No | X mm | Y mm | D mm | R mm |
|---|---|---|---|---|
| 1 | 0.00000 | 0.02000 | −0.00050 | 0.00580 |
| 2 | −0.01726 | 0.00986 | −0.00050 | 0.00580 |
| 3 | −0.01730 | −0.01000 | −0.00050 | 0.00580 |
| 4 | 0.00000 | −0.02000 | −0.00050 | 0.00580 |
| 5 | 0.01730 | −0.01000 | −0.00050 | 0.00580 |
| 6 | 0.01730 | 0.01000 | −0.00050 | 0.00580 |
| 7 | −0.00400 | −0.00030 | −0.00050 | 0.00161 |
| 8 | −0.00703 | 0.01589 | −0.00050 | 0.00161 |
| 9 | −0.00200 | −0.00380 | −0.00050 | 0.00161 |
| 10 | 0.00210 | −0.00380 | −0.00050 | 0.00161 |
| 11 | 0.00190 | 0.00340 | −0.00050 | 0.00161 |
| 12 | −0.00220 | 0.00330 | −0.00050 | 0.00161 |
| 13 | 0.00390 | −0.00030 | −0.00050 | 0.00161 |
| 14 | −0.00608 | −0.01137 | −0.00050 | 0.00247 |
| 15 | −0.00677 | 0.01093 | −0.00050 | 0.00247 |
| 16 | −0.01035 | −0.01407 | −0.00050 | 0.00161 |
| 17 | 0.01018 | −0.01407 | −0.00050 | 0.00161 |
| 18 | 0.01730 | −0.00020 | −0.00050 | 0.00236 |
| 19 | 0.00698 | 0.01583 | −0.00050 | 0.00161 |
| 20 | −0.01730 | −0.00020 | −0.00050 | 0.00236 |
| 21 | 0.00648 | 0.01099 | −0.00050 | 0.00247 |
| 22 | 0.00623 | −0.01124 | −0.00050 | 0.00247 |
| 23 | −0.00750 | −0.00500 | 0.00052 | 0.00315 |
| 24 | −0.00780 | 0.00410 | 0.00052 | 0.00315 |
| 25 | −0.00010 | 0.00890 | 0.00052 | 0.00315 |
| 26 | 0.00750 | 0.00410 | 0.00052 | 0.00315 |
| 27 | 0.00790 | −0.00460 | 0.00052 | 0.00315 |
| 28 | −0.00005 | −0.00911 | 0.00052 | 0.00315 |
| 29 | 0.01332 | −0.00283 | 0.00052 | 0.00163 |
| 30 | 0.01307 | 0.00245 | 0.00052 | 0.00163 |
| 31 | −0.00690 | −0.01600 | 0.00052 | 0.00143 |
| 32 | −0.01040 | 0.01400 | 0.00052 | 0.00143 |
| 33 | −0.01318 | 0.00245 | 0.00052 | 0.00163 |
| 34 | −0.01293 | −0.00239 | 0.00052 | 0.00163 |
| 35 | 0.01040 | 0.01400 | 0.00052 | 0.00143 |
| 36 | 0.00690 | −0.01600 | 0.00052 | 0.00143 |
| 37 | −0.01726 | 0.00986 | 0.00000 | 0.00200 |
| 38 | −0.01739 | −0.01011 | 0.00000 | 0.00200 |
| 39 | 0.00007 | −0.02010 | 0.00000 | 0.00200 |
| 40 | 0.01722 | −0.01011 | 0.00000 | 0.00200 |
| 41 | 0.01740 | 0.01005 | 0.00000 | 0.00200 |
| 42 | 0.00007 | 0.02010 | 0.00000 | 0.00200 |

1. $R_{CM}$ = 0.00315 mm - R of Ideal Circle = 0.0088 mm - Number of $R_{Ci}$ = 6
   $R_{AM}$ = 0.00580 mm - R of Ideal Circle = 0.020 mm - Number of $R_{Ai}$ = 6
2. $R_{AM}/R_{CM}$ = 1.84
3. $R_S/R_L$ = 0.34

Figure 21A:
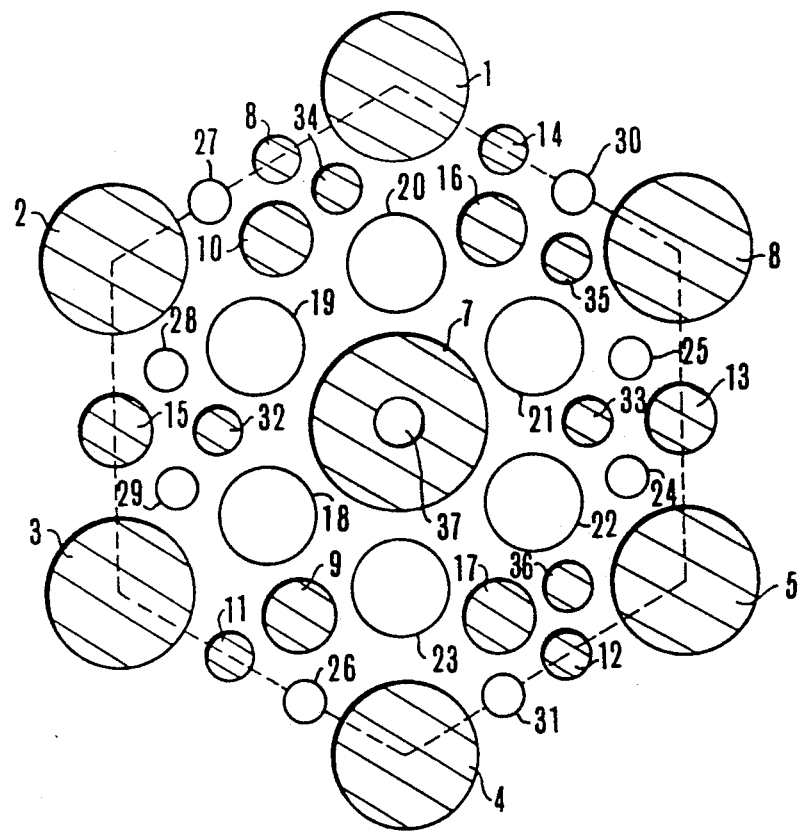
Figure 21B:
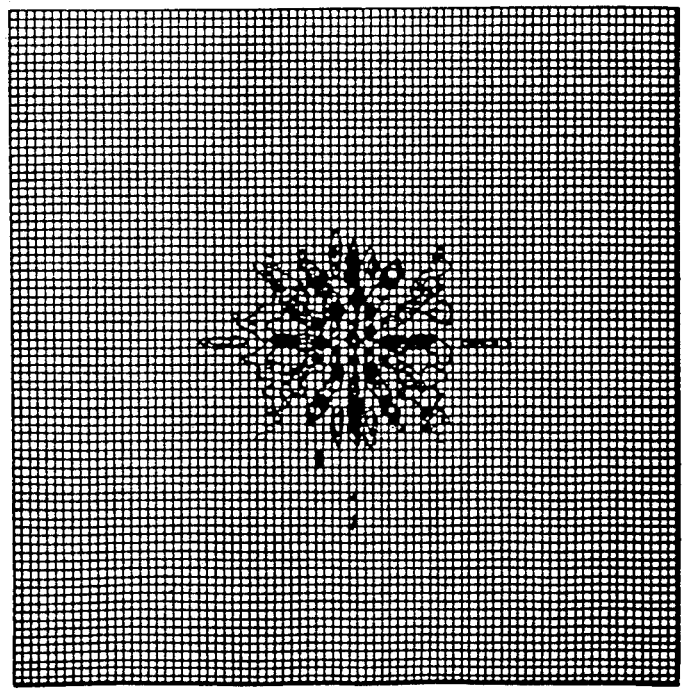

Practical Example 12 (FIGS. 21(a) and 21(b))
One side of Hexagon: 20 μm; T = 35 μm

| Plane Portion | A | B | C |
|---|---|---|---|
| Depth | 0.00052 mm | 0 mm | −0.00050 mm |
| Area Ratio | 22.5% | 44.4% | 33.1% |

| No | X mm | Y mm | D mm | R mm |
|---|---|---|---|---|
| 1 | 0.00000 | 0.02000 | −0.00050 | 0.00450 |
| 2 | −0.01730 | 0.01000 | −0.00050 | 0.00450 |
| 3 | −0.01730 | 0.01000 | −0.00050 | 0.00450 |
| 4 | 0.00000 | −0.02000 | −0.00050 | 0.00450 |
| 5 | 0.01730 | −0.01000 | −0.00050 | 0.00450 |
| 6 | 0.01730 | 0.01000 | −0.00050 | 0.00450 |
| 7 | −0.00010 | −0.00010 | −0.00050 | 0.00550 |
| 8 | −0.00720 | 0.01580 | −0.00050 | 0.00150 |
| 9 | −0.00630 | −0.01160 | −0.00050 | 0.00230 |
| 10 | −0.00730 | 0.01110 | −0.00050 | 0.00230 |
| 11 | −0.01060 | −0.01390 | −0.00050 | 0.00150 |
| 12 | 0.01010 | −0.01420 | −0.00050 | 0.00150 |
| 13 | 0.01730 | −0.00020 | −0.00050 | 0.00220 |
| 14 | 0.00670 | 0.01610 | −0.00050 | 0.00150 |
| 15 | −0.01730 | −0.00020 | −0.00050 | 0.00220 |
| 16 | 0.00600 | 0.01140 | −0.00050 | 0.00220 |
| 17 | 0.00590 | −0.01190 | −0.00050 | 0.00220 |
| 18 | −0.00830 | −0.00540 | 0.00052 | 0.00310 |
| 19 | −0.00870 | 0.00480 | 0.00052 | 0.00320 |
| 20 | −0.00010 | 0.00970 | 0.00052 | 0.00320 |
| 21 | 0.00840 | 0.00450 | 0.00052 | 0.00320 |
| 22 | 0.00820 | −0.00500 | 0.00052 | 0.00320 |
| 23 | −0.00020 | −0.00990 | 0.00052 | 0.00310 |
| 24 | 0.01380 | −0.00360 | 0.00052 | 0.00150 |
| 25 | 0.01430 | 0.00360 | 0.00052 | 0.00150 |
| 26 | −0.00620 | −0.01640 | 0.00052 | 0.00150 |
| 27 | −0.01140 | 0.01360 | 0.00052 | 0.00150 |
| 28 | −0.01430 | 0.00350 | 0.00052 | 0.00150 |
| 29 | −0.01370 | −0.00360 | 0.00052 | 0.00150 |
| 30 | 0.01110 | 0.01360 | 0.00052 | 0.00150 |
| 31 | 0.00590 | −0.01640 | 0.00052 | 0.00150 |
| 32 | −0.01110 | −0.00040 | −0.00050 | 0.00150 |
| 33 | 0.01160 | −0.00030 | −0.00050 | 0.00150 |
| 34 | −0.00360 | 0.01410 | −0.00050 | 0.00150 |
| 35 | 0.01060 | 0.00970 | −0.00050 | 0.00150 |
| 36 | 0.01020 | −0.01020 | −0.00050 | 0.00150 |
| 37 | −0.00010 | −0.00010 | 0.00000 | 0.00150 |

1. $R_{CM}$ = 0.0032 mm - R or Ideal Circle = 0.0098 mm - Number of $R_{Ci}$ = 6
   $R_{AM}$ = 0.0055 mm - R or Ideal Circle = 0
2. $R_{AM}/R_{CM}$ = 1.72
3. $R_M/R_L$ = 0.27

What is claimed is:
1. A focusing screen, comprising:
a base plate having a planar surface; and a plurality of unit regions arrayed with a periodicity on the planar surface of said base plate, each of said unit regions comprising a first plurality of convex portions or concave portions having planar surfaces substantially parallel to said base plate planar surface and having a first height different from said base plate planar surface and having at least two different diameters, and a second plurality of convex portions or concave portions having planar surfaces substantially parallel to said base plate planar surface and having a second height different from said base plate planar surface and having at least two different diameters.

2. A focusing screen according to claim 1, satisfying the following condition:

$$15 \ \mu m \leq T \leq 65 \ \mu m$$

where T is the pitch of said periodicity.

3. A focusing screen according to claim 1, wherein the first plurality of convex portions or concave portions and the second plurality of convex portions or concave portions are disposed in independent relation to each other.

4. A focusing screen according to claim 3, wherein, letting a diameter of the convex portion or concave portion having the smallest diameter among the first plurality of convex portions or concave portions be denoted by Lmin, and letting the shortest distance among distances between adjacent portions of said first plurality of convex portions or concave portions or between adjacent portions of said second plurality of convex portions or concave portions be denoted by D, the following condition is satisfied:

$$|D/Lmin| \leq 1.$$

5. A focusing screen according to claim 1, wherein, letting the absolute value of said first height be denoted by $d_1$, the absolute value of said second height by $d_2$, the refractive index for the d-line of the material of said base plate by nd, and the area ratios in which the base plate planar surface, the planar surface of said first plurality of portions, and the planar surface of said second plurality of portions occupy in each of said unit regions by $S_B$, $S_A$, and $S_C$ respectively, the following conditions are satisfied:

$$40(\%) \leq S_B \leq 60(\%)$$

$$15(\%) \leq S_A \leq 40(\%)$$

$$15(\%) \leq S_C \leq 40(\%)$$

$$0.15 \leq (nd-1)d_1 \leq 0.35$$

$$0.15 \leq (nd-1)d_2 \leq 0.35.$$

6. A focusing screen according to claim 1, wherein, letting the largest of the diameters of the first plurality of convex portions or concave portions be denoted by $2R_{AM}$, the largest of the diameters of the second plurality of convex portions of concave portions by $2R_{CM}$, and the distance to the center of the convex or concave portion positioned farther from the center of the unit region among said $2R_{AM}$ and $2R_{CM}$ by R, a ring-shaped region of from 0.6R to 1.4R contains the centers of at least three convex portions or concave portions satisfying at least one of the following conditions:

$$0.8R_{AM} \leq R_{Ai} \quad (1)$$

$$0.8R_{CM} \leq R_{Ci} \quad (2).$$

7. A focusing screen according to claim 6, wherein, letting the distance from the center of one of the convex portions or concave portions of said $2R_{AM}$ and $2R_{CM}$ which is nearer to the center of said unit region be denoted by $R_1$, a ring-shaped region of from $0.6R_1$ to $1.4R_1$ contains three or more other convex portions or concave portions having the same height as said one of the convex portions or concave portions which is nearer to the center of said unit region while satisfying said condition (1) or (2).

8. A focusing screen according to claim 6, wherein the center of one of the convex portion or concave portion having the diameter of said $2R_{AM}$ or $2R_{CM}$ coincides with the center of said unit region.

9. A focusing screen comprising:
a base plate having a planar surface; and
a plurality of unit regions arrayed with a periodicity on the planar surface of said base plate, each of said unit regions comprising a first plurality of convex portions or concave portions having planar surfaces substantially parallel to said base plate planar surface and having a first height different form said base plate planar surface and having at least two different sizes, and a second plurality of convex portions or concave portions having planar surfaces substantially parallel to said base plate planar surface and having a second height different from said base plate planar surface and having at least two different sizes.

10. A focusing screen according to claim 9, satisfying the following condition:

$$15 \ \mu m \leq T \leq 65 \ \mu m$$

where T is the pitch of said periodicity.

11. A focusing screen according to claim 9, wherein, letting a diameter of the convex portion or concave portion having the smallest diameter among the first plurality of convex portions or concave portions be denoted by Lmin, and letting the shortest distance among distances between adjacent portions of said first plurality of convex portions or concave portions or between adjacent portions of said second plurality of convex portions or concave portions be denoted by D, the following condition is satisfied:

$$|D/Lmin| \leq 1.$$

12. A focusing screen according to claim 9, wherein, letting the largest of the diameters of the first plurality of convex portions or concave portions be denoted by $2R_{AM}$, the largest of the diameters of the second plurality of convex portions or concave portions by $2R_{CM}$, and the distance to the center of the convex or concave portion positioned farther from the center of the unit region among said $2R_{AM}$ and $2R_{CM}$ by R, a ring-shaped region of from 0.6R to 1.4R contains the centers of at least three convex portions or concave portions satisfying at least one of the following conditions:

$$0.8R_{AM} \leq R_{Ai} \quad (1)$$

$$0.8R_{CM} \leq R_{Ci} \quad (2).$$

13. A focusing screen according to claim 12, wherein, letting the distance from the center of one of the convex portions or concave portions of said $2R_{AM}$ and $2R_{CM}$ which is nearer to the center of said unit region be denoted by $R_1$, a ring-shaped region of from $0.6R_1$ to $1.4R_1$ contains three or more other convex portions or concave portions having the same height as said one of the convex portions or concave portions which is nearer to the center of said unit region while satisfying said condition (1) or (2).

14. A focusing screen arranged in a position equivalent to the position of a film plane of a camera, comprising:

a base plate having a planar surface; and a plurality of unit regions arrayed with a periodicity on said planar surface of said base plate, each of said unit regions comprising (1) a first plurality of convex portions or concave portions having planar surfaces substantially parallel to said base plate planar surface and having a first height different from said base plate planar surface and having at least two different sizes, and (2) a second plurality of convex portions or concave portions having planar surfaces substantially parallel to said base plate planar surface and having a second height different from said base plate planar surface and having at least two different sizes.

15. A focusing screen according to claim 14, satisfying the following condition:

$$15 \, \mu m \leq T \leq 65 \, \mu m$$

where T is the pitch of said periodicity.

16. A focusing screen according to claim 14, wherein the first plurality of convex portions or concave portions and the second plurality of convex portions or concave portions are disposed in independent relation to each other.

* * * * *

UNITED STATES PATENT AND TRADEMARK OFFICE
CERTIFICATE OF CORRECTION

PATENT NO. : 5,124,839
DATED : June 23, 1992
INVENTOR(S) : YAMAZAKI ET AL.

It is certified that error appears in the above-identified patent and that said Letters Patent is hereby corrected as shown below:

COLUMN 1

Line 7, "the finder" should read --the view-finder-- and "the" (second occurrence) should read --a--.

COLUMN 4

Line 30, "DC," should read --$D_c$,--.

COLUMN 4

Line 38, "IO" should read --$I_0$--.

COLUMN 6

Line 45, "$0.2 \leq 2 R_m T_m$----(3)" should read --$0.2 \leq 2 R_m/T_m$----(3)--.

COLUMN 12

Line 61, "portion)" should read --portions)--.

COLUMN 16

"18  -0.00830  -0.00540  0.00052  0.00310" should read --18  -0.00830  -0.00540  0.00052  0.00320--.

UNITED STATES PATENT AND TRADEMARK OFFICE
CERTIFICATE OF CORRECTION

PATENT NO. : 5,124,839
DATED : June 23, 1992
INVENTOR(S) : YAMAZAKI ET AL.

It is certified that error appears in the above-identified patent and that said Letters Patent is hereby corrected as shown below:

COLUMN 17

Line 62, "of" (second occurrence) should read --or--.

Signed and Sealed this

Thirty-first Day of August, 1993

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,124,839

DATED : June 23, 1992

INVENTOR(S) : Yamazaki et al.

It is certified that error appears in the above-identified patent and that said Letters Patent is hereby corrected as shown below:

Column 12, line 61, "portion)" should read --portions)--.
Column 16, Practical Example 12, "3 -0.01730  0.00310  -0.00050  0.00450" should read --3 -0.1730  0-.01000  0.00050  0.00450

Signed and Sealed this

Twenty-ninth Day of November, 1994

Attest:

BRUCE LEHMAN

*Attesting Officer*     *Commissioner of Patents and Trademarks*